(12) United States Patent
Smits et al.

(10) Patent No.: US 12,401,905 B2
(45) Date of Patent: Aug. 26, 2025

(54) FOVEATED ROBOTIC VISION SYSTEM

(71) Applicant: Summer Robotics, Inc., Campbell, CA (US)

(72) Inventors: Gerard Dirk Smits, Los Gatos, CA (US); Steven Dean Gottke, Concord, CA (US)

(73) Assignee: Summer Robotics, Inc., Campbell, CA (US)

( * ) Notice: Subject to any disclaimer, the term of this patent is extended or adjusted under 35 U.S.C. 154(b) by 84 days.

(21) Appl. No.: 18/221,816

(22) Filed: Jul. 13, 2023

(65) Prior Publication Data

US 2024/0022819 A1 Jan. 18, 2024

Related U.S. Application Data

(60) Provisional application No. 63/368,440, filed on Jul. 14, 2022.

(51) Int. Cl.
*H04N 23/695* (2023.01)
*G06T 7/13* (2017.01)
(Continued)

(52) U.S. Cl.
CPC ............. *H04N 23/695* (2023.01); *G06T 7/13* (2017.01); *G06T 7/20* (2013.01); *H04N 23/56* (2023.01); *H04N 25/702* (2023.01)

(58) Field of Classification Search
CPC .... H04N 23/695; H04N 23/56; H04N 25/702; H04N 23/45; G06T 7/13; G06T 7/20
See application file for complete search history.

(56) References Cited

U.S. PATENT DOCUMENTS

| 6,748,112 B1 | 6/2004 | Nguyen et al. |
| 9,117,267 B2 | 8/2015 | Francis, Jr. et al. |

(Continued)

FOREIGN PATENT DOCUMENTS

| CN | 109458928 A | 3/2019 |
| CN | 112365585 A | 2/2021 |

(Continued)

OTHER PUBLICATIONS

Office Communication for U.S. Appl. No. 18/121,486 mailed Aug. 16, 2023, pp. 1-2.

(Continued)

*Primary Examiner* — Nasim N Nirjhar
(74) *Attorney, Agent, or Firm* — John W. Branch; Branch Partners PLLC

(57) ABSTRACT

Embodiments are directed to vision systems. Enclosures that each include event scanners, beam generators, or frame cameras may be provided such that the event cameras or the frame cameras may be arranged to provide foveated resolution and such that the enclosures each may include an aperture that enables beams from the beam generators to scan a scene that may be in a field-of-view (FOV) of the aperture. Paths may be scanned across objects in the scene with the beams. Events may be determined based on detection of beam reflections corresponding to objects in the scene. The enclosures may be rotated to orient the apertures into a physical position for continued scanning of the objects within the FOV based on directions of travel for the objects such that the directions of travel for the objects is based on scanned trajectories.

30 Claims, 15 Drawing Sheets

(51) Int. Cl.
*G06T 7/20* (2017.01)
*H04N 23/56* (2023.01)
*H04N 25/702* (2023.01)

(56) References Cited

U.S. PATENT DOCUMENTS

| | | |
|---|---|---|
| 9,489,735 B1 | 11/2016 | Reitmayr |
| 11,704,835 B2 | 7/2023 | Cullen et al. |
| 11,785,200 B1 | 10/2023 | Smits et al. |
| 11,808,857 B2 | 11/2023 | Cullen et al. |
| 11,887,340 B2 | 1/2024 | Cullen et al. |
| 11,974,055 B1 | 4/2024 | Smits et al. |
| 2008/0012850 A1 | 1/2008 | Keating, III |
| 2008/0165360 A1 | 7/2008 | Johnston |
| 2008/0201101 A1 | 8/2008 | Hebert et al. |
| 2009/0096994 A1 | 4/2009 | Smits |
| 2011/0122233 A1 | 5/2011 | Kasai et al. |
| 2011/0273442 A1 | 11/2011 | Drost et al. |
| 2014/0105506 A1 | 4/2014 | Drost et al. |
| 2014/0368614 A1 | 12/2014 | Imai et al. |
| 2015/0378023 A1 | 12/2015 | Royo Royo et al. |
| 2016/0180574 A1 | 6/2016 | Kaminitz et al. |
| 2016/0259168 A1 | 9/2016 | Katz et al. |
| 2017/0035281 A1 | 2/2017 | Takeuchi et al. |
| 2017/0176575 A1 | 6/2017 | Smits |
| 2017/0195589 A1 | 7/2017 | Kovacovsky et al. |
| 2018/0180733 A1* | 6/2018 | Smits .................. G06T 7/521 |
| 2019/0128665 A1 | 5/2019 | Harendt |
| 2019/0213309 A1 | 7/2019 | Morestin et al. |
| 2019/0258869 A1* | 8/2019 | Stelzer ................ G06T 7/246 |
| 2019/0279379 A1 | 9/2019 | Srinivasan et al. |
| 2020/0075658 A1 | 3/2020 | Kato et al. |
| 2020/0160012 A1 | 5/2020 | Nunnink et al. |
| 2020/0280664 A1 | 9/2020 | Lee et al. |
| 2021/0023714 A1 | 1/2021 | Zhang et al. |
| 2021/0141094 A1 | 5/2021 | Russ et al. |
| 2021/0261159 A1 | 8/2021 | Pazhayampallil et al. |
| 2021/0278539 A1 | 9/2021 | Laddha et al. |
| 2021/0304574 A1 | 9/2021 | Ramanathan et al. |
| 2022/0156998 A1 | 5/2022 | Lee et al. |
| 2022/0187461 A1 | 6/2022 | Cullen |
| 2022/0222845 A1 | 7/2022 | Inada |
| 2022/0287676 A1 | 9/2022 | Steines et al. |
| 2023/0003549 A1 | 1/2023 | Paden |
| 2023/0015889 A1 | 1/2023 | Cullen et al. |
| 2023/0034733 A1 | 2/2023 | Cullen et al. |
| 2023/0060421 A1 | 3/2023 | Cullen et al. |
| 2023/0169683 A1 | 6/2023 | Paden et al. |
| 2023/0230212 A1 | 7/2023 | García et al. |
| 2023/0274523 A1 | 8/2023 | Paden et al. |
| 2023/0316657 A1 | 10/2023 | Smits et al. |
| 2023/0360268 A1 | 11/2023 | Cullen et al. |
| 2024/0040274 A1 | 2/2024 | Smits et al. |
| 2024/0114235 A1* | 4/2024 | Gallagher ............. H04N 23/20 |
| 2024/0129645 A1 | 4/2024 | Smits et al. |

FOREIGN PATENT DOCUMENTS

| | | |
|---|---|---|
| CN | 112750168 A | 5/2021 |
| CN | 113313710 A | 8/2021 |
| CN | 116829902 A | 9/2023 |
| EP | 4260006 A1 | 6/2022 |
| JP | H06-94428 A | 4/1994 |
| JP | 2009-243986 A | 10/2009 |
| JP | 2018-195240 A | 12/2018 |
| JP | 2020-52719 A | 4/2020 |
| JP | 2020-64011 A | 4/2020 |
| JP | 2020-106475 A | 7/2020 |
| JP | 2021-167776 A | 10/2021 |
| WO | 2013/093459 A2 | 6/2013 |
| WO | 2018000037 A1 | 1/2018 |
| WO | 2018125850 A1 | 7/2018 |
| WO | 2019189381 A1 | 10/2019 |
| WO | 2020/061214 A1 | 3/2020 |
| WO | 2020080237 A1 | 4/2020 |
| WO | 2021039022 A1 | 3/2021 |
| WO | 2021140886 A1 | 7/2021 |
| WO | 2022132828 A1 | 6/2022 |
| WO | 2023/278868 A1 | 1/2023 |
| WO | 2023/288067 A1 | 1/2023 |
| WO | 2023/009755 A1 | 2/2023 |
| WO | 2023/028226 A1 | 3/2023 |
| WO | 2023/096873 A1 | 6/2023 |
| WO | 2023/164064 A1 | 8/2023 |
| WO | 2023/177692 A1 | 9/2023 |
| WO | 2023/196225 A1 | 10/2023 |
| WO | 2024/025865 A1 | 2/2024 |

OTHER PUBLICATIONS

International Preliminary Report on Patentability for International Patent Application No. PCT/US2021/063399 mailed Jun. 29, 2023, pp. 1-5.
International Search Report and Written Opinion for International Patent Application No. PCT/US2023/017271 mailed Jul. 11, 2023, pp. 1-7.
Office Communication for U.S. Appl. No. 18/121,486 mailed Aug. 3, 2023, pp. 1-10.
International Search Report and Written Opinion for International Patent Application No. PCT/US2021/063399 mailed Mar. 22, 2022, pp. 1-7.
International Search Report and Written Opinion for International Patent Application No. PCT/US2022/036006 mailed Oct. 4, 2022, pp. 1-8.
International Search Report and Written Opinion for International Patent Application No. PCT/US2022/037299 mailed Oct. 25, 2022, pp. 1-7.
International Search Report and Written Opinion for International Patent Application No. PCT/US2022/038724 mailed Nov. 1, 2022, pp. 1-7.
International Search Report and Written Opinion for International Patent Application No. PCT/US2022/041520 mailed Nov. 8, 2022, pp. 1-7.
Office Communication for U.S. Appl. No. 17/876,333 mailed Feb. 21, 2023, pp. 1-22.
Office Communication for U.S. Appl. No. 17/876,333 mailed Mar. 1, 2023, pp. 1-2.
International Search Report and Written Opinion for International Patent Application No. PCT/US2022/050626 mailed Mar. 7, 2023, pp. 1-8.
Office Communication for U.S. Appl. No. 17/895,489 mailed Apr. 11, 2023, pp. 1-36.
International Search Report and Written Opinion for International Patent Application No. PCT/US2023/013718 mailed May 30, 2023, pp. 1-7.
Office Communication for U.S. Appl. No. 18/130,080 mailed Jun. 20, 2023, pp. 1-36.
Office Communication for U.S. Appl. No. 17/895,489 mailed Jul. 5, 2023, pp. 1-13.
International Search Report and Written Opinion for International Patent Application No. PCT/US2023/015227 mailed Jun. 27, 2023, pp. 1-7.
Office Communication for U.S. Appl. No. 18/222,780 mailed Sep. 15, 2023, 10 Pages.
Office Communication for U.S. Appl. No. 18/225,833 mailed Sep. 15, 2023, 19 Pages.
Office Communication for U.S. Appl. No. 18/130,080 mailed Sep. 28, 2023, 43 Pages.
International Search Report and Written Opinion for International Patent Application No. PCT/US2023/028551 mailed Oct. 24, 2023, 09 Pages.
Office Communication for U.S. Appl. No. 17/551,054 mailed Jul. 16, 2024, 12 Pages.
Office Communication for U.S. Appl. No. 17/856,690 mailed Jul. 10, 2024, 11 Pages.
Office Communication for U.S. Appl. No. 17/856,690 mailed Jul. 24, 2024, 4 Pages.

(56) References Cited

OTHER PUBLICATIONS

International Preliminary Report on Patentability for International Patent Application No. PCT/US2022/036006 mailed Jan. 11, 2024, 6 Pages.
International Preliminary Report on Patentability for International Patent Application No. PCT/US2022/037299 mailed Jan. 25, 2024, 5 Pages.
International Preliminary Report on Patentability for International Patent Application No. PCT/US2022/038724 mailed Feb. 8, 2024, 5 Pages.
International Preliminary Report on Patentability for International Patent Application No. PCT/US2022/041520 mailed Mar. 7, 2024, 5 Pages.
International Preliminary Report on Patentability for International Patent Application No. PCT/US2022/050626 mailed Jun. 6, 2024, 6 Pages.
Office Communication for U.S. Appl. No. 18/488,123 mailed Jan. 2, 2024, 10 Pages.

\* cited by examiner

FOVEATED ROBOTIC VISION SYSTEM

CROSS-REFERENCE TO RELATED APPLICATION

This application is a Utility Patent application based on previously filed U.S. Provisional Patent Application U.S. Ser. No. 63/368,440 filed on Jul. 14, 2022, the benefit of the filing date of which is hereby claimed under 35 U.S.C. § 119(e), and the contents of which is further incorporated in entirety by reference.

TECHNICAL FIELD

The present innovations relate generally to machine sensing or machine vision systems, and more particularly, but not exclusively, to foveated robotic vision systems.

BACKGROUND

Further, machine vision system for robotics using video streams has become a growing field. However, analysis of video streams for 3-D information is often imprecise, particularly in dynamic environments with varying/unpredictable scenes or backgrounds. Furthermore, this may introduce disadvantageous latency into the final output. For example, commonly many frames of video need to be analyzed to build up information sufficient for immersion or other requirements related to objects or the scene being measured. In some cases, perception of the positions and shapes of objects using a vision system in a robot may be useful for the robot to interact with the world. Data from multiple cameras can be taken and processed, but combination of video from multiple sources may be challenging, especially if the video streams are captured using 2-D camera sensors. Also, registration of objects in the video may be complicated by having different perspectives for each camera, especially if objects in the scene may be moving. Thus, it is with respect to these considerations and others that the present innovations have been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
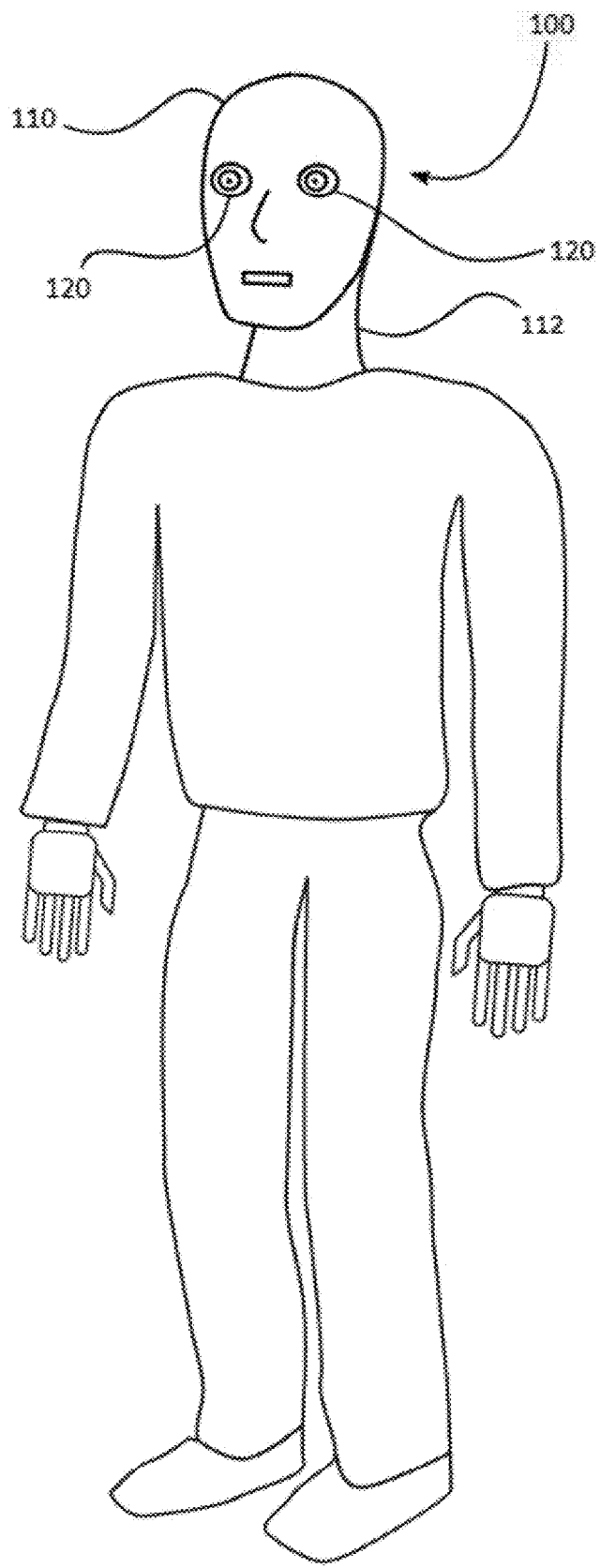
FIG. 1 is a perspective view of a humanoid robot with perception systems according to specific embodiments.

Various embodiments now will be described more fully hereinafter with reference to the accompanying drawings, which form a part hereof, and which show, by way of illustration, specific exemplary embodiments by which the innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the present innovations.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PUP, Perl, JavaScript, Ruby, VBScript, Microsoft .NET™ languages such as C#, or the like. An engine may be compiled into executable programs or written in interpreted programming languages. Software engines may be callable from other engines or from themselves.

Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "scanning signal generator," "signal generator," or "beam scanner" refer to a system or a device that may produce a beam that may be scanned/directed to project into an environment. For example, scanning signal generators may be fast laser-based scanning devices based on dual axis microelectromechanical systems (MEMS) that are arranged to scan a laser in a defined area of interest. The characteristics of scanning signal generator may vary depending on the application or service environment. Scanning signal generators are not strictly limited to lasers or laser MEMS, other types of beam signal generators may be employed depending on the circumstances. Critical selection criteria for scanning signal generator characteristics may include beam width, beam dispersion, beam energy, wavelength(s), phase, or the like. Scanning signal generator may be selected such that they enable sufficiently precise energy reflections from scanned surfaces or scanned objects in the scanning environment of interest. The scanning signal generators may be designed to scan at various frequencies, including up to 10 s of kHz. The scanning signal generators may be controlled in a closed loop fashion with one or more processors that may provide feedback about objects in the environment and instructs the scanning signal generator to modify its amplitudes, frequencies, phase, or the like.

As used herein, the terms "event sensor, or" "event camera" refer to a device or system that detects reflected energy from scanning signal generators. Event sensors may be considered to comprise an array of detector cells that are responsive to energy reflected from scanning signal generators. Event sensors may provide outputs that indicate which detector cells are triggered and the time they are triggered. Event sensors may be considered to generate sensor outputs (events) that report the triggered cell location and time of detection for individual cells rather than being limited to reporting the state or status of every cell. For example, event sensors may include event sensor cameras, SPAD arrays, SiPM arrays, or the like.

As used herein the terms "image sensor," or "frame camera" refer to a device or system that can provide electronic scene information (electronic imaging) based on light or other energy collected at surface the image sensor. Conventionally, image sensors may be comprised of charge-coupled devices (CCDs) or complementary metal oxide semi-conductors (CMOS) devices. In some cases, image sensors may be referred to as frame capture cameras. Also, in some cases, image sensors may be deployed or otherwise used as to collect event information.

As used herein the terms "foveated camera," or "foveated camera system" may refer to a camera system that may have a relatively wide field of view (FOV) to capture a large portion of scenes but also have other portions that have a relatively narrow FOV that simultaneously capture a smaller part of the same scenes at higher detail. A 3-D foveated camera system may also include components such as an event camera as well as a beam scanner. Multiple event cameras or scanners may be used to obtain improved capture speed and improved collection of dynamic information about surfaces of objects in the scenes. Multiple cameras with different FOVs and/or different sensor pixel sizes might be used or combined to create foveated frames or events. Frame capture cameras are relatively standard cameras and may have a global shutter that enables them to measure frames of data about the scene within their FOV at a particular frame rate. Event cameras trigger individually and asynchronously at each pixel based on light level differences.

As used herein the terms "trajectory," "parametric trajectory," "surface trajectory" refers to one or more data structures that store or represent parametric representations of curve segments that may correspond to surfaces sensed by one or more sensors. Trajectories may include one or more attributes/elements that correspond to constants or coefficients of segments of one-dimensional analytical curves in three-dimensional space. Trajectories for a surface may be determined based on fitting or associating one or more sensor events to known analytical curves. Sensor events that are inconsistent with the analytical curves may be considered noise or otherwise excluded from trajectories.

As used herein the term "configuration information" refers to information that may include rule-based policies, pattern matching, scripts (e.g., computer readable instructions), or the like, that may be provided from various sources, including, configuration files, databases, user input, built-in defaults, plug-ins, extensions, or the like, or combination thereof.

The following briefly describes embodiments of the innovations in order to provide a basic understanding of some aspects of the innovations. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to foveated robotic vision systems. In one or more of the various embodiments, one or more enclosures that each include one or more of one or more event scanners, one or more beam generators, or one or more frame cameras may be provided such that one or more of the one or more event cameras or the one or more frame cameras may be arranged to provide foveated resolution and such that the one or more enclosures each may include an aperture that enables one or more beams from the one or more beam generators to scan a scene that may be in a field-of-view (FOV) of the aperture.

In one or more of the various embodiments, a plurality of paths may be scanned across one or more objects in the scene with the one or more beams.

In one or more of the various embodiments, a plurality of events may be determined based on detection of one or more beam reflections corresponding to one or more objects in the scene.

In one or more of the various embodiments, a plurality of trajectories may be determined based on the plurality of paths and the plurality of events such that each trajectory may be a parametric representation of a one-dimensional curve segment in a three-dimensional space.

In one or more of the various embodiments, the one or more enclosures may be rotated to orient the aperture into a physical position for continued scanning of the one or more objects within the FOV based on one or more directions of travel for the one or more objects such that the one or more directions of travel for the one or more objects is based on the one or more trajectories.

In one or more of the various embodiments, detecting the one or more beam reflections may include, detecting the one or more beam reflections by the one or more event cameras included in the one or more enclosures.

In one or more of the various embodiments, rotating the one or more enclosures along the one or more axes may include: moving a fovea of the one or more frame cameras to position the one or more objects in a center of one or more sensors of the one or more frame cameras; employing the one or more frame cameras to capture one or more images such that the one or more objects are centered in the one or more captured images; or the like.

In one or more of the various embodiments, providing the one or more of the one or more event cameras or the one or more frame cameras may include, providing the one or more of the one or more event cameras or the one or more frame cameras that have a pixel density that is higher at a center of a sensor of the one or more of the one or more event cameras or the one or more frame cameras such that the pixel density is gradually decreasing towards the periphery of the sensor of the one or more of the one or more event cameras or the one or more frame cameras.

In one or more of the various embodiments, the one or more event cameras or the one or more frame cameras may include, integrating one or more foveation lenses into focusing optics of the one or more of the one or more event cameras or the one or more frame cameras such that the one or more foveation lenses spread out a light field coming into a center of one or more sensors of the one or more of the one or more event cameras or the one or more frame cameras to achieve a foveated effect.

In one or more of the various embodiments, a light source that is separate from the one or more beam scanners may be provided to emit a beam of light centered around the aperture for one or more of the one or more enclosures. In some embodiments, one or more edges of the one or more objects may be detected based on a portion of the one or more events that correspond to the one or more edges of the one or more objects interrupting the beam of light. In some embodiments, one or more positions of the one or more edges may be employed to predict subsequent motion of the one or more objects.

In one or more of the various embodiments, one or more portions of the one or more enclosures may be associated with one or more portions of the one or more objects such that each portion of the one or more enclosures tracks the one or more portions of the objects respectively.

DETAILED DESCRIPTION

Video capture through standard frame capture cameras may be a common method of implementing vision systems for robots. In some cases, conventional methods for recognizing objects or tracking objects, particularly as they move, may be complex, slow, power-hungry, or have other disadvantages. In addition, in some cases, it may be difficult to obtain sufficient detail in the resulting video stream to discern some object features.

FIG. 1 shows an example of a humanoid robot that includes 3-D foveated camera systems in accordance with one or more of the various embodiments. In this example, for some embodiments, robot 100 comprises head 110 that may swivel around neck 112. In some embodiments, heads of robots may have two or more eyes, such as eyes 120. In some embodiments, robots may have arms and hands in various configurations to allow the robots to interact with their environment. As shown in this example, robots may have legs and feet to enable them to move around their environment but in some embodiments, robots may also move around using wheels, tracks, rails, pivot points, or other means. In some embodiments, eyes may additionally be located on various locations rather than being limited to "heads" of robots, such as hands, torso, sensor mounts, or the like. In some embodiments, eyes, such as, eyes 120 may be arranged to rotate within robot heads, such as, head 110, but the heads may also be able to rotate to increase the total field of view of cameras contained therein. In some embodiments, eyes that may rotate to follow portions of interest in the scene or moving objects may be used to provide true vergence of the eyes, along with deblurring from movement. In some embodiments, robotic eyes that are configured to foveate may also give improved details about the scene when pointed toward objects of interest.

Note, one of ordinary skill in the art will appreciate that there are many variations of robots that provide many sensor arrangements or motion features that are within the scope of the innovations described herein. Accordingly, in the interest of brevity and clarity, robot 100 is presented as a non-limiting example that may be used to represent several features of robots discussed herein.

Further, in some embodiments, robots, such as, robot 100 may include one or more scanning devices (e.g., scanning devices 722) or sensing systems (e.g., sensing system 720). For example, in some embodiments, portions of one or more of sensing engine 922, modeling engine 924, calibration engine 926, or the like, may be hosted on computers that may be included in the robot. Also, in some embodiments, one or more components or modules of sensing engine 922, modeling engine 924, or calibration engine 926 may be hosted remotely from the body of the robot such that they may be communicatively coupled with the robot via one or more networks.

Figure 2:
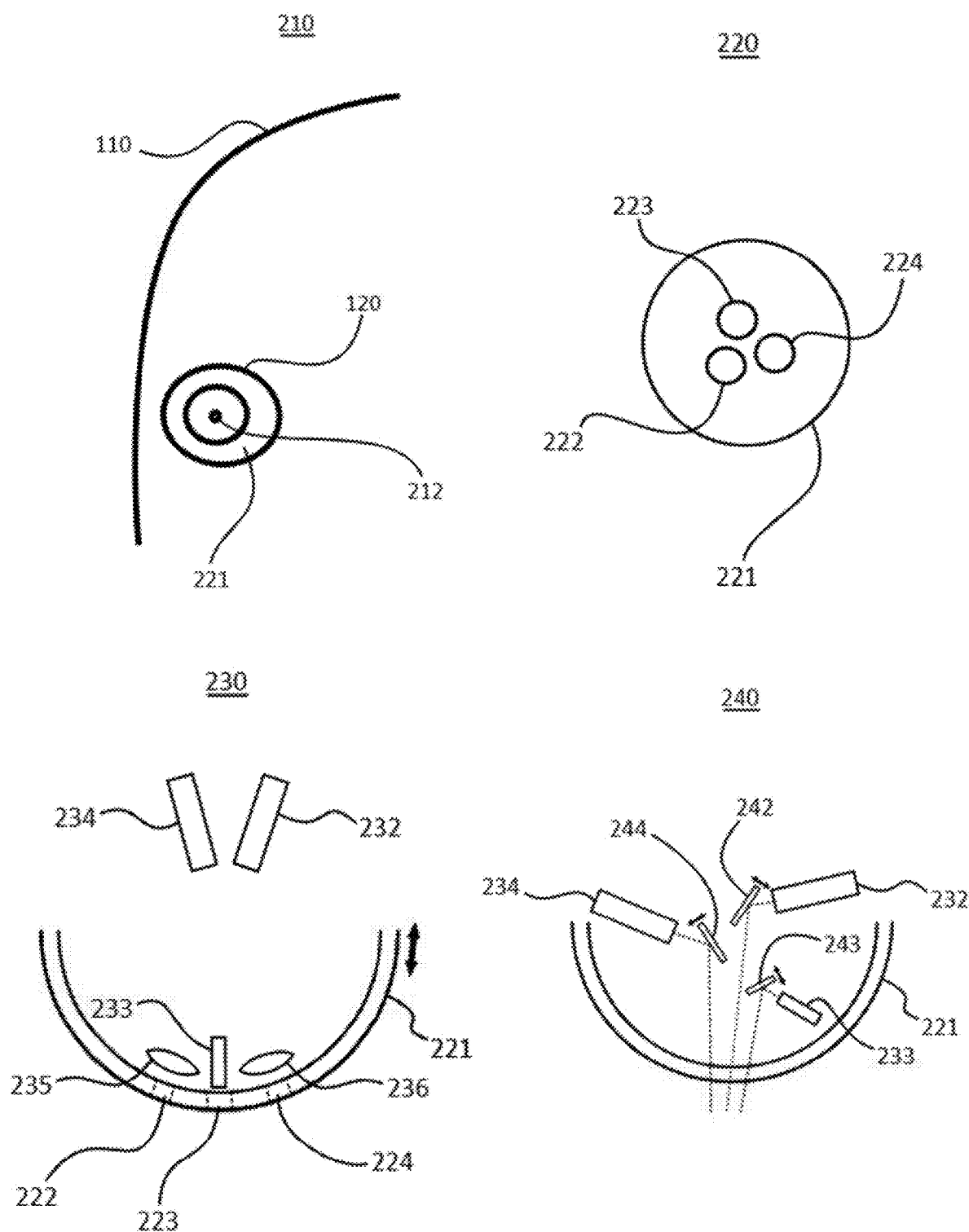
FIG. 2 is a close-up view of an eye of the robot as shown in FIG. 1, along with several cross-sectional views according to specific embodiments.

FIG. 2 may illustrate close-up views of one of eyes 120 of the robot head in accordance with one or more of the various embodiments.

In this example, view 210 shows one eye, eye 120. In this example, for some embodiments, eye 120 may have an iris for aesthetic purposes that does not block light from entering cameras inside the eye. Eye 120 may include one or more apertures, such as, aperture 212, but in some embodiments, the surface of the eye may be transparent such that no external apertures may be visible.

In this example, view 220 shows the internal structure of an eye, such as eye 120. In some embodiments, moving portion 221 may be arranged into a spherical shape or other shape (e.g., ellipsoid) that may be enabled to rotate in more than one dimension or may only be a portion of the outer shell of a sphere or other shape (hereinafter referred to as a sphere or the sphere).

In some embodiments, spheres need not rotate completely around but should be capable of turning apertures in the eye toward the extents of the eye socket or some other desired set of angles. In this example, three apertures, such as, aperture 222, aperture 223, or aperture 224 are illustrated here.

Also, in this example, view 230 shows a cross-section of the interior of sphere 221. In some embodiments, apertures may be larger or smaller depending on the desired FOV of each portion of the eye. In some embodiments, various elements may be fixed inside moving portion 221 such that they may rotate all together. In one configuration, a scanner, such as scanner 233 may be positioned to direct scanning beams through aperture 223. In some embodiments, scanner 233 may be mounted near the surface of the sphere but might be positioned farther back; the exact position may be not as important as ensuring that the range of scanning may be somewhat larger than the fields of view of one or more cameras inside eye 120. In some embodiments, an event camera, such as event camera 232 may be mounted to collect light through aperture 222.

Also, in some embodiments, one or more lenses in a lens system, such as lenses 235 may be mounted for focusing or other purposes in event cameras, such as event camera 232. In some embodiments, lenses 235 may be mounted near the surface of moving portion 221, near event camera 232, or both. Similarly, in some embodiments, one or more frame capture cameras, such as frame capture camera 234 may be mounted to receive light through aperture 224, with lenses 236 or other optical components.

In addition, in some embodiments, the surface of spherical portion 221 may be shaped to act as a lens as part of the optical system. Although this figure shows a top view where components appear crowded, some or all components may be considered to be relatively centered in a 3-D space around a center axis of the eye and so may be placed so as to not block the light paths of either of the cameras or the scanner.

In some embodiments, the surface of spherical portion 221 may be arranged to remain stationary with internal mirrors that move to modify its viewing direction or FOV. Accordingly, view 240 of FIG. 2 shows three relay mirrors, such as relay mirror 242, relay mirror 243, or relay mirror 244 that may rotate about two axes and point respectively toward event camera 232, scanner 233, and frame capture camera 234. In some embodiments, the movement of the relay mirrors may be coordinated to "rotate" the view of the eye in a desired direction. In some cases, for some embodiments, portions of the light to be captured may overlap. In some embodiments, a relay mirror such as relay mirror 242 may instead be a dichroic beam splitter that may be configured to reflect light at the wavelength of the scanner into event camera 232. Accordingly, in some embodiments, light of other wavelengths, and possibly some percentage of the scanner wavelength may pass through the beam splitter into another relay mirror, such as relay mirror 244 to be captured by frame capture camera 234. In some embodiments, each eye may have a controller to set the rotational position of the central eye axis over time, and may also have sensors, such as optical or mechanical encoders, to read out the current eye position to give feedback to the controller.

In some embodiments, one or more of the cameras in eye 120 may be foveated. In some embodiments, either the frame capture cameras, or the event cameras, or both may be foveated such that the resolution of the scene as imaged by a camera may be higher toward the center of its sensor as compared to the resolution nearer to its periphery. One of ordinary skill in the art will appreciate that foveation of a camera may be accomplished using a variety of means. In one embodiment of a foveated camera, the image sensor of the camera may be custom-built such that its pixels are smaller near the center of the image sensor array, and larger toward its edges. In another embodiment of the foveated camera, a more conventional image array with regular pixels may be used, but instead foveation optics using foveation lenses may be used instead such that the foveation lenses may be integrated into the focusing optics of a camera. For instance, in some embodiments, lenses 236 may have a number of components that may be adjustable to set the focus of the camera but may also be set to spread out the light field coming into the center of the camera near its optical axis to achieve a foveated effect.

In some embodiments, frame capture camera 234 may capture the scene in a monochrome fashion, but in many cases, it may capture image frames in full-color. In some configurations, event camera 232 may be arranged to capture light at the wavelength scanned on the scene by scanner 233 and may filter out light of other wavelengths. In some cases, a foveated lens system used in a full-color capture system may be more complex than the event camera lens system since it may be arranged to compensate for chromatic aberrations.

Figure 3:
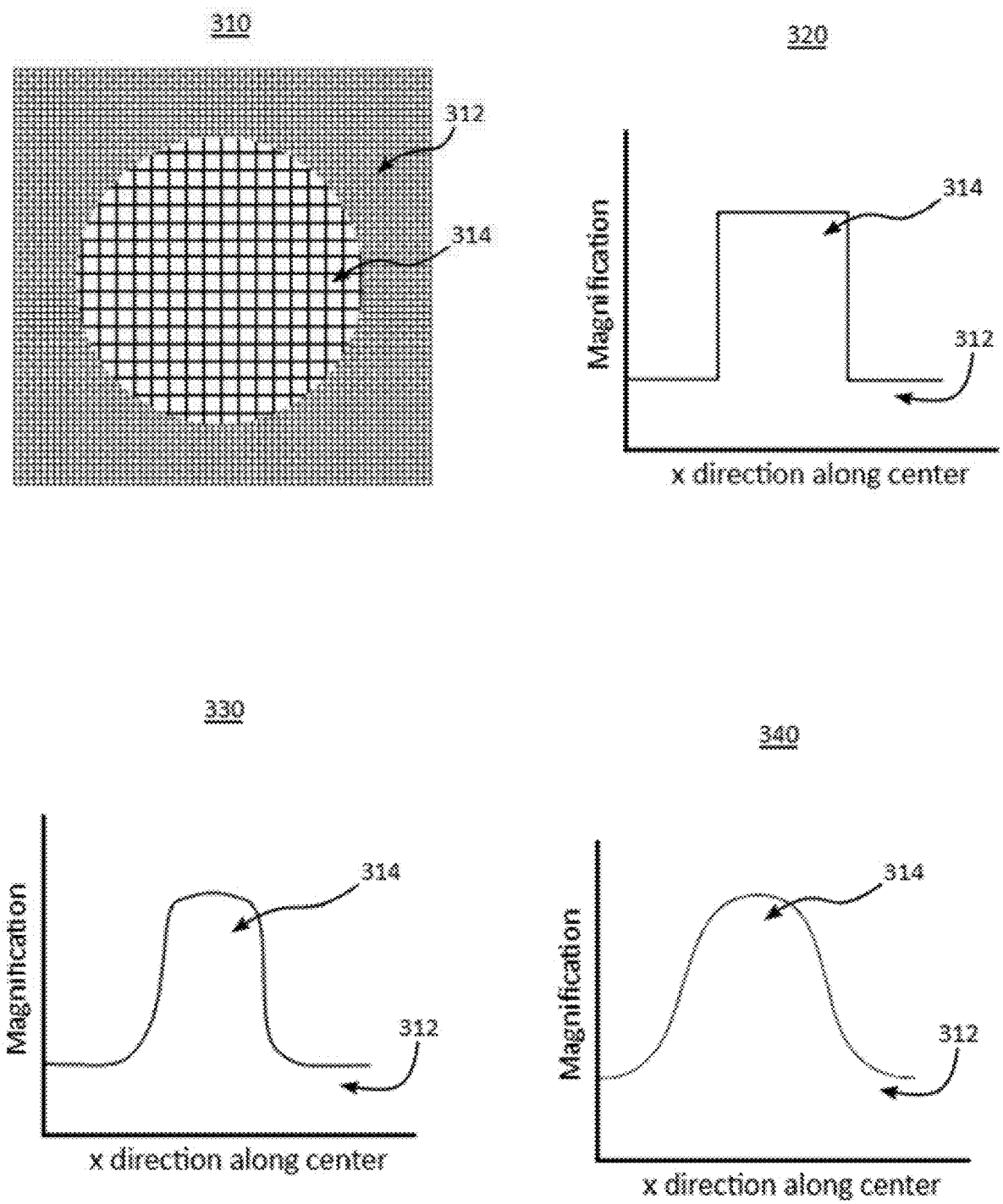
FIG. 3 shows various diagrams explaining different ways of foveating a camera image according to specific embodiments.

One of ordinary skill in the art will appreciate that implementation of foveation for a camera may have many variations. One example of output of a foveated camera may be seen in FIG. 3 according to some embodiments. The foveated area in the center may have a sharp boundary between one part and the next. View 310 shows the image sensor of a camera that may be considered to be imaging a hypothetical square grid, where central portion 314 may be highly magnified compared to the outer portions. In this example, for some embodiments, view 320 may be a graph visualization that illustrates the level of magnification across the center of portion 314 in a horizontal direction. Accordingly, in some embodiments, the proportion between the two areas may be arbitrary and may be chosen to match various parameters based on local requirements or local circumstances. For instance, the width of the FOV of the camera may encompass 60°, while the FOV of inner circle 314 may encompass only 10°, but in some cases the central portion could be a greater or lesser amount of the total area of the sensor depending on local requirements or local circumstances. In these cases, more pixels may be used to measure a portion of the image near the center compared to the periphery. Other shapes are possible in other embodiments. View 330 shows a similar relatively flat plateau area corresponding to portion 314 but in this example has smoother transitions between area 314 and area 312. Further, in this example, view 340 represents a visualization of a smoothly varying magnification across the array. In some embodiments, an eye may have more than one fovea where each foveal position may have the same or different focal distance.

Figure 4:
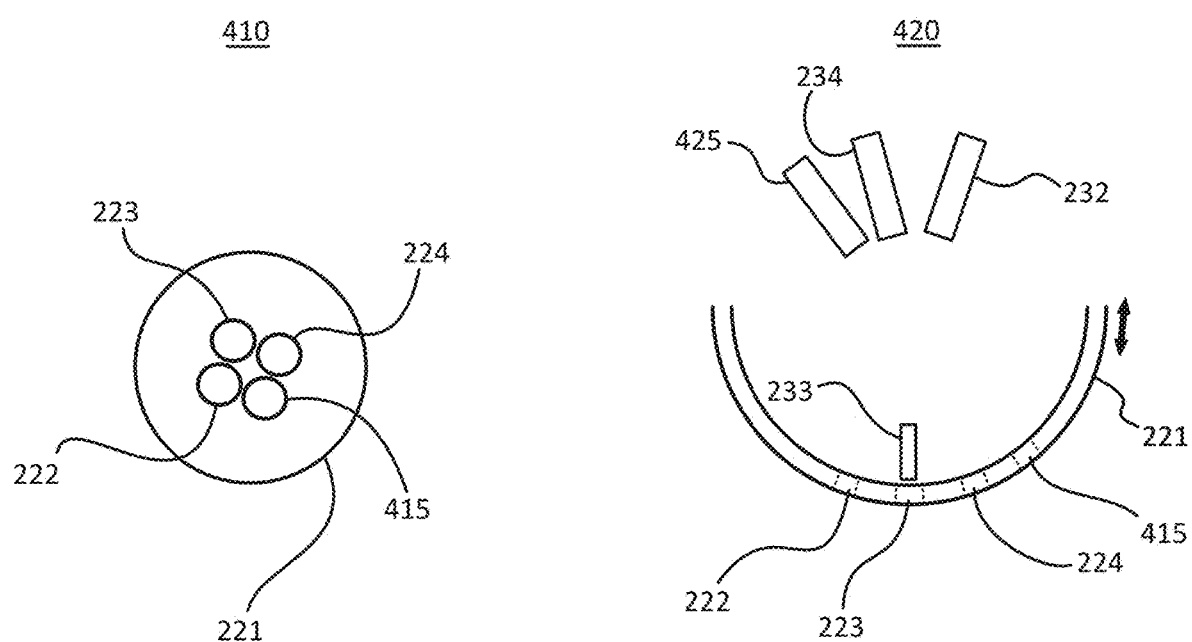
FIG. 4 shows configurations of a close-up view of an eye and a cross-sectional view according to specific embodiments.

In some embodiments, foveation may be introduced by using additional cameras. FIG. 4 shows in view 410 an eye similar to that shown in view 220, but eye spherical surface 221 has an additional aperture. Accordingly, view 420 shows a fourth aperture (aperture 415) which may enable light to be imaged by an additional camera, such as camera 425. For brevity and clarity, focusing components or other optical elements are not shown but may be assumed to be included in the system. In an example, camera 425 may be a frame capture camera which may be positioned to have a similar optical axis as that of frame capture camera 234. However, different focusing lenses may be chosen for each camera. Although the lens systems for each camera may not be foveating, lenses for camera 425 may be configured to have a wider FOV than camera 234. For instance, camera 425 may have a full 60° FOV, while camera 434 may only have a 10° FOV. Thus, the image data from camera 234 may be similar to the central portion of the image from camera 425, but with higher resolution. In some embodiments, camera 234 and camera 425 may be substantially identical except for their respective focusing lens systems, but this may be not required; also in some embodiments image sensor sizes or frame rates may be quite different for different cameras. Also, in some embodiments, similar methods may be used to provide foveation by adding an additional event camera to the eye. Regardless of the method of foveation, the results may include image data with high resolution near an optical axis coming out from the eye surrounded by a higher angle FOV image with lower resolution. In some embodiments, such images may be combined as needed or may be left separate for later image processing. In some embodiments, a single image captured using a foveating lens may be processed to remove distortions from the image to restore a more standard projection of the subjects captured in the image. Also, in some embodiments, since the eye may rotate to follow objects of interest in the scene, the high-resolution portion of captured images may migrate within the image based on the eye's focus direction or range of motion.

In some embodiments, conventional systems that include foveated cameras may be employed for scene capture, but generally they may require disadvantageously significant real-time image processing to be useful. Accordingly, in some embodiments, camera eyes such as eye 120 may provide improved utility because of the addition of the beam scanner and event cameras to the eye system. In particular, in some embodiments, the overall system may have two or more eyes in it. In some embodiments, a system with two or more event cameras viewing one or more scanning beams may also be used for 3-D measurement of the surface positions of objects as the beams scan across them. This process has been described elsewhere, but in brief time-parameterized functions may be fit to events captured as the result of a beam point scanning across the surface of an object. These event trajectory paths on each event camera may be combined to create 3-D trajectories corresponding to surface positions of the objects in the scene. Because paths may be scanned at hundreds or thousands of Hz across the scene, near-real time 3-D data may be calculated about objects in a scene. Multiple beams may be scanned at once and measured by all cameras that have objects that are scanned within their FOV.

In some embodiments, calibration of event cameras with each other may be straightforward. This may be accomplished dynamically, where methods such as bundle adjustment, matching beam trajectory crossing points, or the like may be employed to determine the relative positions and angles among the various event cameras. In some embodiments, calibration of event cameras may be simplified in embodiments if the event cameras do not use a foveated lens, however in those embodiments where event cameras do have a foveated view, calibration may still be performed quickly. The foveation as well as the focusing portions of the lens systems leading into each event camera may be thoroughly characterized before use in the system, and thus the distortions introduced deliberately by the lens may be modeled and calculated out as part of position calibration. In specific embodiments, both types of cameras could include foveation; this would allow not just high-resolution video of objects in the scene, but also high-resolution scanning of 3-D surfaces. In other embodiments, just the frame capture camera may be foveated.

In some embodiments, frame capture cameras may be calibrated to be at a known position with respect to event cameras in each eye. Accordingly, in some embodiments, the scanner may output a beam that may be of sufficient power such that the trajectories on various objects on the scene may be simultaneously observed by event cameras and frame capture cameras. Thus, in some embodiments, calibration engines of a sensing system may be arranged to calibrate event cameras using a variety of types of data from scanned trajectories, but calibration engines may have access to timestamps of individual events corresponding to scanned beam points that comprise the trajectories on object surfaces. In some embodiments, frame capture cameras may produce image frames at a lower rate than the rate of events being reported by event cameras, and so may not have fine-grained times of trajectories they see. However, in some embodiments, frame cameras may be enabled to capture the begin and ends of trajectories, as well as positions of virtual crossings where more than one beam crosses a position on the object; these virtual crossings may be matched up with those detected on each event camera, which allows the system also to precisely calibrate the position over time of each frame capture camera.

Although, in some embodiments, event camera positions may be recalibrated many times a second using scanning data alone, robotic vision systems may provide additional information to either fine-tune the calibration, increase the speed of calibration, or both. For example, in some embodiments, rotational sensors, whether optical or mechanical, may be placed in each eye 120. Thus, in some embodiments, as an eye rotates to change its field of view, the eye may continuously (or near-continuously) report its rotational position to calibration engines to aid in calibration calculations for both event camera or frame capture cameras, as well as the central optical axis of the scanner. In some embodiments, eyes may be configured to place the optical center of the cameras as close as may be practical to the center of rotation of the eye. In specific embodiments, the optical center of the event camera in the eye may be placed substantially at the center of rotation of the eye; in these cases, rotation of each eye may have less of an impact on the translation of the camera near the rotation center of the eye with respect to other cameras in the system.

In some embodiments, tracking of objects or merging of objects seen by frame capture cameras may become simpler if 3-D position data from event cameras may be known for each frame. In some embodiments, this may be especially true if tracking and measuring moving objects in the scene. Though, in some cases, frame capture cameras alone may be used to find and track objects in a scene, there may be a disadvantageous delay or lag if doing so, especially if several frames of data must be processed to first recognize an object to be tracked, and then processed to detect movement sufficient to trigger a response. In contrast, in some embodiments, data about surfaces from two or more event cameras in the system may find edges and shapes of objects in the scene within milliseconds to separate objects out for tracking.

Figure 5A:
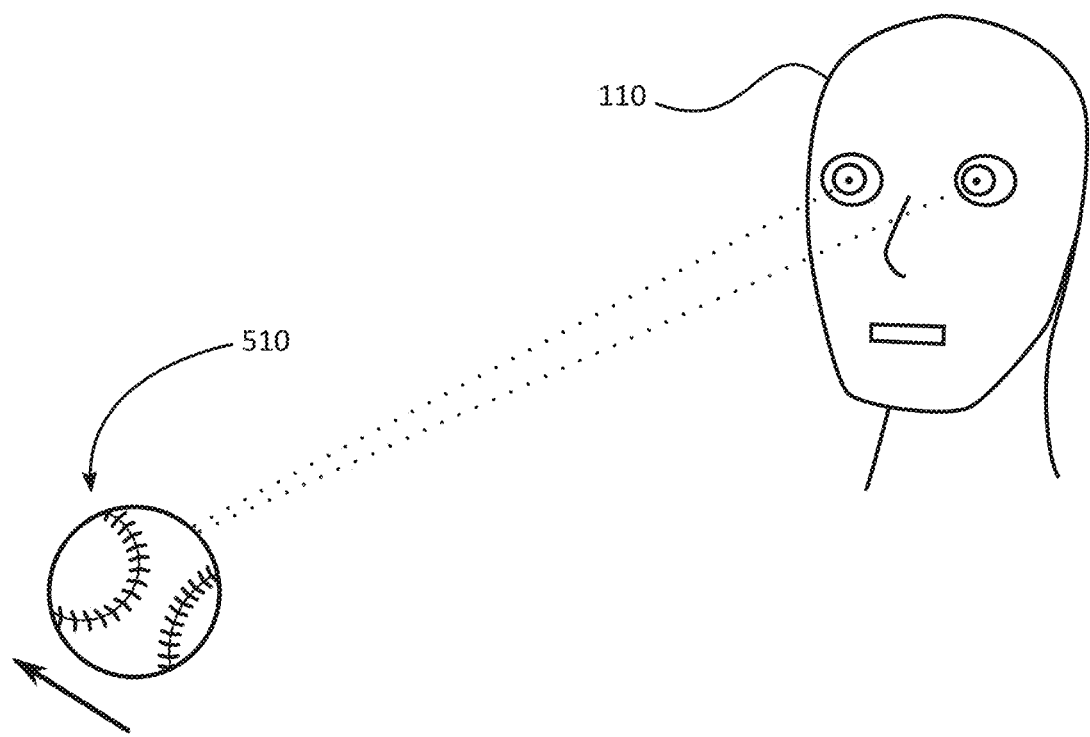
FIG. 5A is a perspective view of a humanoid robot perception system tracking a moving object according to specific embodiments.

FIG. 5A shows an example of a robot tracking a baseball 510 moving through the air in front of it in accordance with one or more of the various embodiments. Although, in this example, the baseball may be considered to be moving relative to a stationary robot, in some cases the robot may be moving through its environment as well. Note, for brevity and clarity only robot head 110 is shown here. In some embodiments, to obtain higher resolution images of a moving object such as moving object 510, the eyes may be moved such that the fovea of the frame capture camera moves to a position where the object may be centered in the frame. In some embodiments, because the eyes may be calibrated internally as well as externally with respect to each other, the position of the object relative to the eyes may be determined quickly. Accordingly, in some embodiments, the controller for each eye may set the rotation of the eye such that the object of interest may remain centered with the fovea of its cameras. If it may be centered, the controller may continue to move each eye to keep the object centered in the frame. In some embodiments, this may be affected by the speed of eye rotation that may be available to the system. For example, in some embodiments, an eye where the rotation may be accomplished by internal relay mirrors may be able to move faster than system configured to move the entire eye sphere. In some embodiments, if an object may be centered, tracking of objects may be done using the frame capture camera, but in some embodiments, 3-D surface data from event cameras may be used to improve the capture information. In some embodiments, 3-D capture of objects at fast speeds may not only allow the eyes to follow the object but may also be able to predict the trajectory of its movement. Accordingly, in some embodiments, this may allow the controller to move the eyes so that they may in the proper position to center the object in the frame just as it will be captured by the frame capture camera. To an outside observer, the robot's eye may appear to track and follow the object of interest. In some embodiments, if more than one eye may be following the same object, the eyes may appear to have vergence upon the object. Also, in some embodiments, the focus of cameras may be adjusted dynamically based on knowledge of object position and depth.

In some embodiments, proper correspondence of images may be assisted if the frame capture camera also continues to observe scanned beams on the object. Accordingly, in some embodiments, if one or more scanned stripes cross the object during the capture of a frame, this may be visible to cameras at both eyes, and may be used to localize the position of the frames. Because the frame capture cameras may also capture intensity as well as position, they may provide information for determining approximation of distances to objects as well and may be used to disambiguate multiple objects in the scene. For example, for some embodiments, a brighter reflection in the frame capture camera at the scanned beam wavelength would indicate a relatively close object to the robot eyes. However, even without continued crossing trajectories, the precise calibration of the frame capture camera with the event camera position and knowledge of object position enables the system to pinpoint a small range within the image sensor of the frame capture camera to find the object. Conventionally, merging images from multiple frame capture cameras often requires a detailed algorithmic search to properly overlap the two frames accounting for differences in perspective as well as to estimate or predict uncertainties in object position. In contrast, in some embodiments, employing information associated with scanned beams in the registration process may advantageously reduce the search space and time for combining these the different images.

In some embodiments, foveation may improve the appearance of the object in the center of the frame. Conventionally, it may be difficult to track an object using a very narrow FOV in the center of the camera but using the event camera data to localize the eye position over time, the center of the frame may precisely track the object. In the example in FIG. 5A, the position of the baseball may be tracked by the event camera data, but the appearance may be captured with the foveated center of the frame capture cameras. in this example, as the baseball moves through the air, the cameras may track it precisely enough so that motion blur may be reduced. In some embodiments, if the trajectory of the baseball has been correctly measured and predicted using event camera data, the eyes may rotate to follow the motion to reduce or remove the blur that would otherwise be measured within each frame of the camera video stream. Thus, in some embodiments, frame blur may be partially or completely eliminated even if the baseball may be moving fast enough so that the movement may be noticeable in the time of a single video frame. In some cases, motion blur may occur if the object being tracked is also rotating at a sufficiently high speed, but that may also be useful as the system could track which direction an object may be rotating and at what speed. For example, in some embodiments, rotational data may be obtained as well if the object has a number of shape asymmetries that may be observed by the event cameras, but in the case of a baseball 510 or similar object, raised stitching on the object may not be sufficient to detect rotational movement that the frame capture cameras may otherwise capture.

Figure 5B:
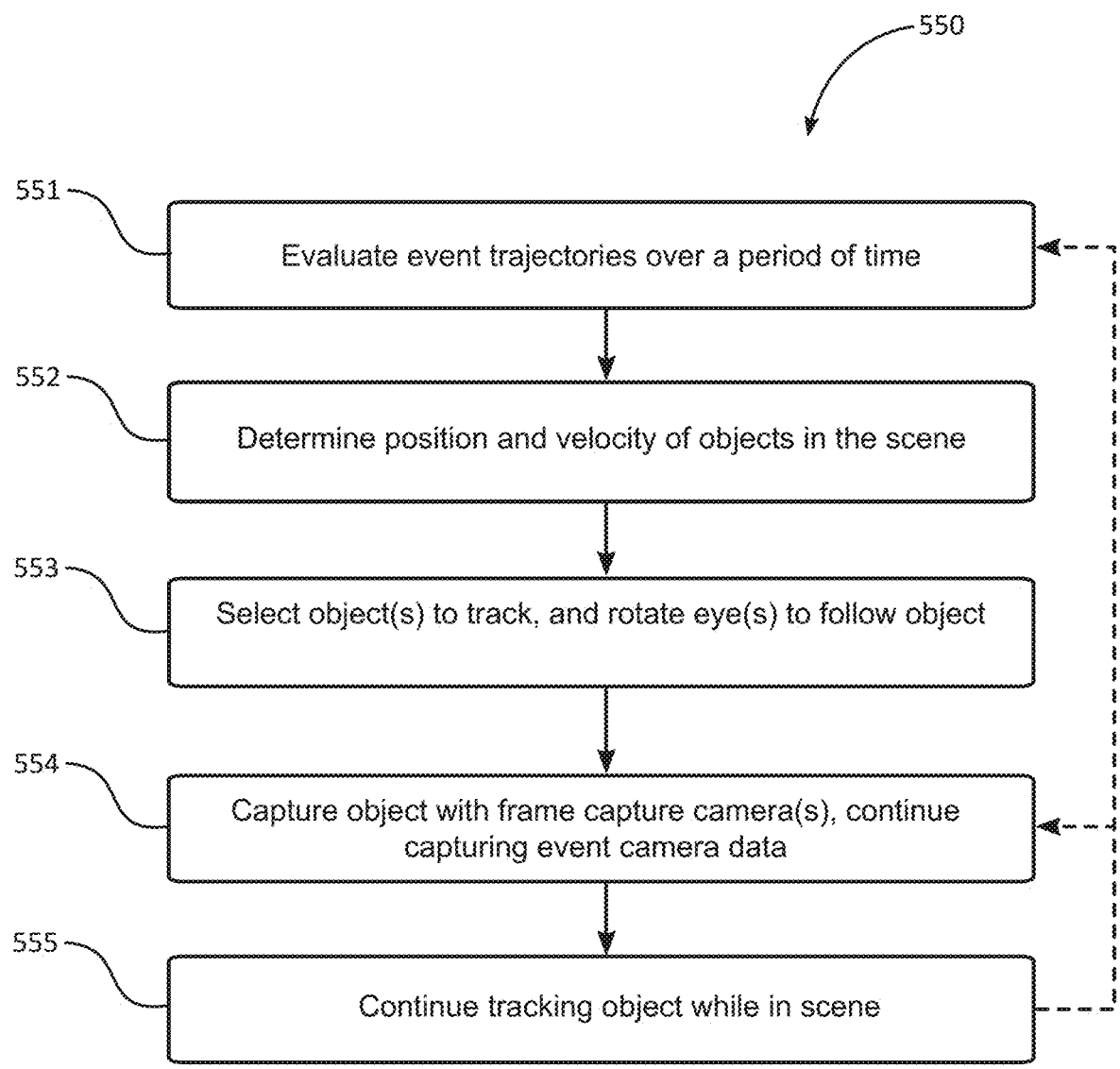
FIG. 5B illustrates a method of tracking a moving object by a perception system according to specific embodiments.

FIG. 5B shows process 550 for tracking an object as seen in FIG. 5A in accordance with one or more of the various embodiments.

In step 551, in one or more of the various embodiments, two or more event cameras may be configured to measure scanned trajectories throughout a scene. These event cameras may be part of a rotatable eye as described herein, but some may be different cameras mounted to the robot at various other locations on the robot frame. In some embodiments, each event camera may observe scanned beams from any eye or other scanned beams and use the reflected event spots to determine the 3-D position in space at the event times on the surface of various objects.

In step 552, in one or more of the various embodiments, objects may be determined in the scene. Determination of objects may include matching the shapes to known shapes for identification or classification of the object, but in some embodiments, it may be sufficient to ascertain and separate out separate objects in the scene (e.g., object segmentation). In some embodiments, some objects may appear to be single objects, but over time as they move or separate, they may be determined to be separate objects that may be tracked on their own after this determination. Since, for some embodiments, one purpose of process 550 may be to track objects as they move relative to the robot, speed of motion capture may be advantageous for tracking fast-moving objects. Thus, in some embodiments, for this step, determining the position of the extents of objects may take precedence over exact determination of their overall shape. In some embodiments, edges of the object may be pinpointed based on determining the start and end points of scan trajectories. Also, in some embodiments, beam scanners may be configured to scan over the scene at different rates; fast scanners may capture less detail but may flood the entire scene with scanned curves or lines so that objects may be less likely to be missed if they come into the scene. In some embodiments, scanners may be configured to scan more slowly to capture more 3-D detail but may miss some faster moving or smaller sized objects that move into or through a scene. In some embodiments, both configurations may be possible. In specific embodiments, a system may include multiple laser beam scanners that may scan at different speeds from one another. Accordingly, if object positions have been identified, object motion or velocity may be obtained as well. In some cases, if at higher scanning speeds, the event camera time resolution may remain faster than most movements in the scene. In some embodiments, edges of objects may be estimated or tracked as they move in X, Y, Z directions with respect to the robot. Alternatively, in some embodiments, centroids of objects may be calculated to estimate motion. Although this has been described using event cameras without foveation, it could be accomplished using foveated event cameras as well. In an embodiment where foveation may be accomplished using a lens that produces variable magnification at the event camera sensor, the camera may detect events over a wider FOV; in this case, there may be higher density of information nearer to the optical axis of the camera, but positions of events closer to the periphery of the camera sensors may still be detected and used to obtain positions of objects with slightly higher error tolerances. Often, in some embodiments, these positions and calculated velocities may be sufficient to direct the eyes positioning at later steps.

In step 553, in some embodiments, objects may be selected for tracking. The objects selected for tracking may be separated into at least two types, including primary objects for close tracking, or secondary objects for movement and position. In some embodiments, at least two eyes in the system may have event cameras without foveation, and thus may see over their entire FOV with the same resolution. Whether or not the eyes rotate to follow chosen objects may be occurring, a system with at least two event cameras may also follow an arbitrary number of objects simultaneously. Initially, in some embodiments, the objects detected may be first classified as secondary objects. Next, one or more of these objects may be determined by a controller using desired criteria as primary objects for closer tracking. In some embodiments, criteria for selecting which secondary objects to assign as primary objects may include one or more of speed of motion, size of the moving object, trajectory shape or location of object compared to the robot, possibility of object collision with the robot, previous recognition or tracking of an object, or the like. In this case, one or more eyes may be assigned to track or rotate to stay centered as closely as possible on the object as it moves. At the time of the determination step 552, the position of the object may be known with respect to the cameras in the eye, and the eye may start to be rotated toward this object. If additional information about the velocity has been determined, in specific embodiments, this information may also be used to direct the center of the eye toward where the object may be expected to be. Further, in some embodiments, continual tracking may alert the eye to changes in velocity as well. Once an eye may be centered on the object, it may continue to track it and follow it. Because this process may be very quick, in some cases soon after the object enters the wider FOV of the system, this may be termed as fast pursuit. In cases where one or more of the event cameras may be also foveated, 3-D data about the structure and movement of that object may become more precise if the higher resolution portion may be aligned toward the object.

In step 554, in one or more of the various embodiments, while the eye may be tracking an object and keeping it centered, the event cameras may continue to collect data on object positioning and provide feedback to the controller as to how best to rotate the eye to continue stable tracking. At the same time, in some embodiments, frame capture cameras in the eye may be configured to continuously take frames of video data at their given frame rate. In some embodiments, once the eye has been centered in the frame and may be tracking the movement, a trigger may be sent to the frame capture camera to begin capturing frames. In either case, the result should be a frame captured of the object with significantly less motion blur. In some embodiments, capturing may be iterated in step 555 until the object leaves the scene (or leaves the possible FOV of one or more of the cameras including rotation of the eyes) or else another target object in the scene becomes higher priority for tracking.

Figure 5C:
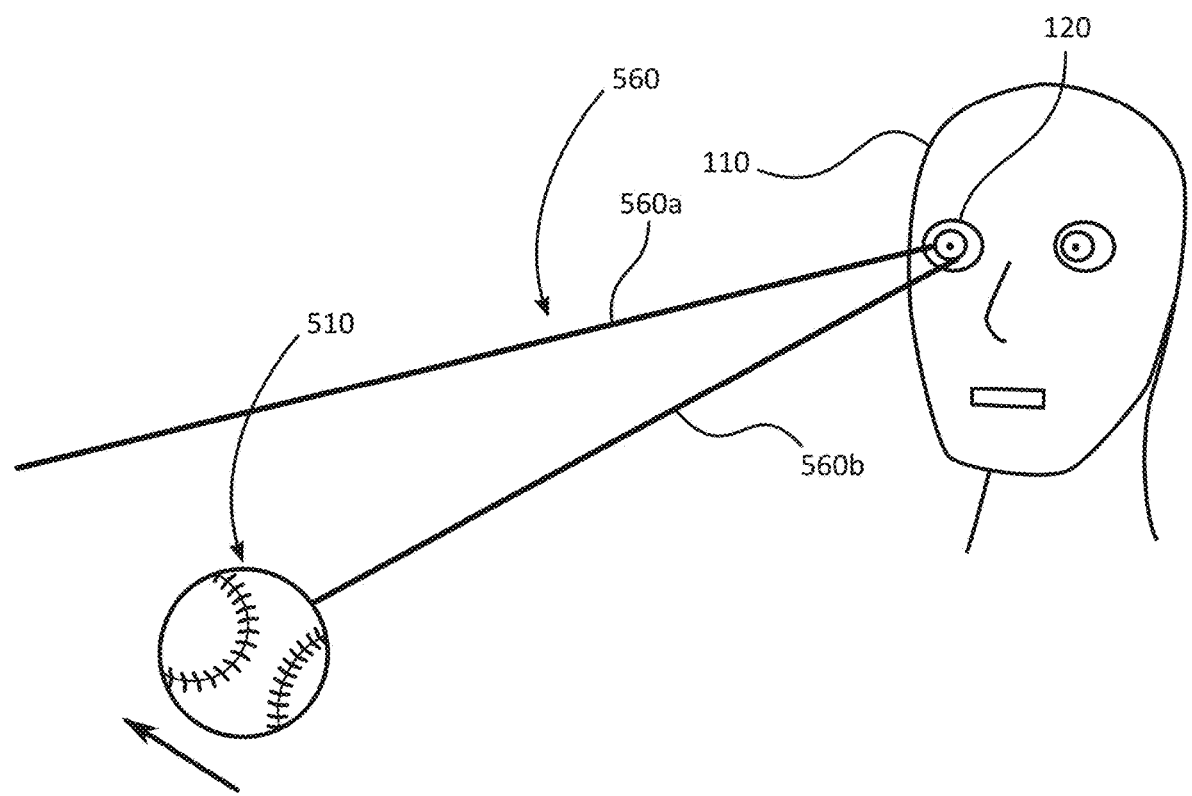
FIG. 5C is a perspective view of a humanoid robot perception system tracking a moving object according to specific embodiments.

In embodiments as described thus far, event cameras have been used to track laser scanners at a particular wavelength and use reflections from the scanned beams to triangulate surface positions of objects in the scene. In specific embodiments, event cameras in an eye may be configured to capture object edges and movement directly to supplement other data. FIG. 5C shows one example of this, where additionally eye 120 includes a searchlight, such as searchlight 560 in place of or in addition to a beam scanner. In some embodiments, searchlight 560 shines from the eye in a solid angle delineated in the figure as 560a and 560b. In some embodiments, searchlights, such as searchlight 560 may have a relatively narrow FOV as shown here but may also be configured to have a wider FOV, in some cases wider than the FOV seen by the event camera in the eye. Thus, in some embodiments, objects such as baseball 510 may be detected by the eye quicker than even by the scanning beam portion, and that object may be flagged for attention as a candidate for tracking. In specific embodiments, the searchlight may be created by an LED diode, or may be created by another laser passing through a beam expander. In some embodiments, the wavelength of light of the searchlight may be substantially the same or with substantial overlap as the laser scanner. If using an event camera sensor to detect scanned beams, much higher signal-to-noise may be obtained by using narrow band-pass filters to screen out most ambient light in the scene. Though noisy events may still appear on the event camera, they may interfere much less if extracting scan trajectory data from the event stream. By using a searchlight of similar wavelength to the beam scanner, the same event camera may be used for both functions. In some cases, the searchlight could be used while scanning the beam, but in other cases, the beams and searchlights may be modulated so that their functions may be interleaved over time. In specific embodiments, there may be more than one event camera positioned in the eye, configured with different color filters. One event camera could be used to track a laser scanner over objects in the scene, and a second one could be used in conjunction with a searchlight for object detection and tracking as described. In this way, the two functionalities would not interfere with each other.

In some embodiments, an event camera sensor may be used to view sudden changes in lighting on a scene very quickly. If used as described in previous embodiments with a laser scanner, points and contours of a surface may be measured quickly. However, in some cases, even with fast scanning, there may be cases where objects may not be found, either due to noise event data, or because an object may be quick enough to give uncertain scan trajectories on its surface. In some embodiments, searchlight 560 may be used in concurrence with an event camera to more reliably detect objects moving into the FOVs of the cameras in the system. While searchlight 560 may be turned on, an object that moves into its illumination may be detectable as a sudden reflection into the event camera; this may be particularly noticeable at the object's edges where the transition happens on the event camera pixels. This may also be more noticeable when an object moves from a far-field distance into a near-field distance. In some embodiments, the searchlight may be alternated with scanning beams on the object to determine its shape, position, and velocity. In specific embodiments, once an object has been found, the searchlight may be left off until needed later to find new objects. In this case, once the laser scanner has picked up the object position, that may be used to continue to track the object. In specific embodiments, a searchlight may be used for some interval without a laser scanner; in this case, the edges of the object detected by the searchlight on the object as it moves may be enough to determine the angle of the object with respect to that event camera's eye. Because the edges may be determined quickly, if the extent of the object may be partially or wholly seen, it may be centered in the event camera and thus made to appear more stationary in other cameras of the eye. If the event camera may be used in this mode, then its data could be used alone to direct the rotation of the eye to follow the object; here event data would not need to be combined with data from other event cameras in other eyes to find the angle of the object for tracking. In some embodiments, the angular information for tracking from two or more eyes could be used to estimate an object's position; greater precision could then be obtained in laser scanning mode by this or other eyes in the system. In some embodiments, the laser scanner range may be limited to the area where the high-precision capture of the object may be to be taken.

Figure 6:
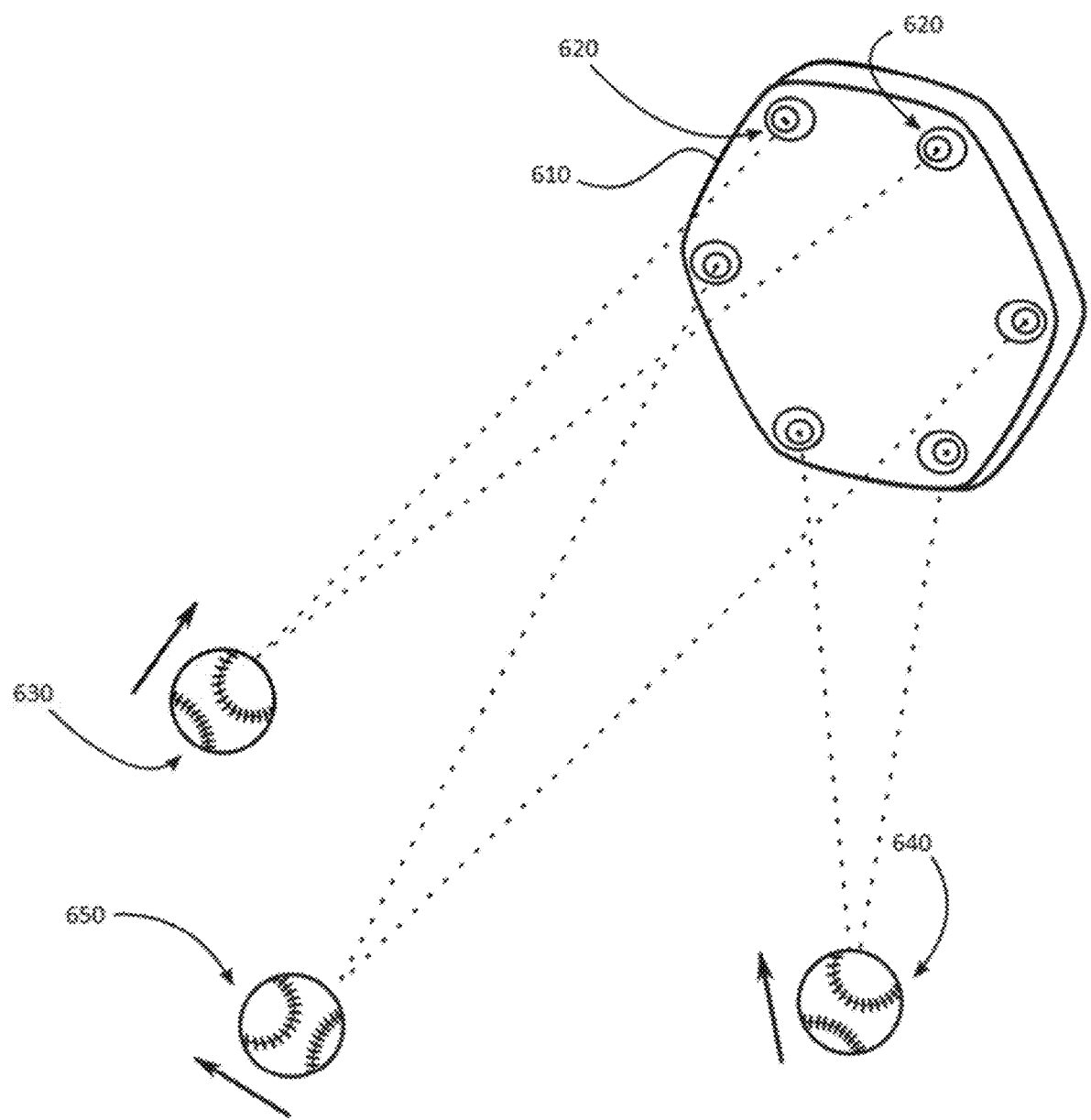
FIG. 6 is a perspective view of a robot perception system tracking multiple moving objects according to specific embodiments.

In some embodiments, the robot head need not be anthropomorphic; an example of this may be shown in FIG. 6. In one embodiment, an alternate robot head 610 may be used that has more than two eyes 620 in it. The eyes may be placed in arbitrary locations on the head. In this example, they may be shown facing forward, but there may be additional eyes on the reverse side of the head as well. Accordingly, in some embodiments, event camera data from some or all of the event cameras may be combined to determine the 3-D structure of the scene as described above, though the data may be more detailed than before as there may be now more sources of data. In some embodiments, multiple objects may be tracked simultaneously, each with more than one camera. In an example, for some embodiments, baseball 630, baseball 640, and baseball 650 may be considered to be moving in different directions at different speeds through the fields of view of the eye cameras. Accordingly, in some embodiments, the controller may select objects to track and assign one or more eyes to follow each object. Note that if two or more eyes may be tracking a single object, the frame capture camera view may be captured stereoscopically, but in some embodiments, if more objects may be available to track, the eyes may be set to individually track objects. Note that this may apply as well to event cameras, especially if they may be foveated at well, but it may be not necessary. The set of event cameras in the system spanning multiple eyes may each track many objects and surfaces at once regardless of how the eyes rotate and whether they may be assigned to follow an object over a time range. In some embodiments, tracking may be accomplished at very high speeds with good precision. In one example, a robot with multiple eyes may simultaneously track a baseball that may be moving toward it as well as the exact position of a baseball bat that may be held by one of the robot's arms. Because the motion trajectories and positions of both ball and bat could be measured and updated in near real-time, the robot may be able to strike and hit the ball with a desired velocity and angle. Catching and throwing an object may be similarly improved by using the multiple eye sensor system.

As mentioned previously, in some embodiments, there may be additional eyes distributed in different locations in the system. In some embodiments, a robot may have additional eyes mounted on the body, where the body eyes may or may not be able to rotate and may or may not include foveation. In some embodiments, the robot may have an eye on each hand. Eyes mounted on the hands of the robot may rotate similarly to other eyes with a spherical surface or some other means, but in one embodiment, the eyes may be fixed in the hand; the eyes may still be rotated to track objects, but in this case the hand and arm could move the optical center axis of the eye to track objects more closely. In addition, having eyes in the hands or other extended portions has other benefits. 3-D positioning of object surfaces may be often based on using triangulation to determine the position of scanned beams on the objects. Triangulation may have a longer effective range of the distance between two or more of the cameras used for this purpose may be farther apart providing greater disparity. In some embodiments, the robot may move its arms far away from the robot body to increase disparity and thus increase its range.

In some embodiments, eyes in the robot may be substantially identical, but in some embodiments, various eyes could have different capabilities. For instance, in some embodiments, the beam scanner embedded in some eyes may be capable of scanning the scene at a higher power than other scanners in other eyes. This may be used if there may be objects in the scene that may be farther away from the robot (possibly detected by frame capture camera data or other sensors). At some distances, power levels used to measure closer objects may not give sufficiently strong reflections to be detected well by the event cameras or the frame capture cameras. In this case, the higher-powered scanners may be activated to improve signal quality. Laser scanners may be configured to scan the scene with continuous wave laser beams. In some embodiments, a beam at high power scanning over the entire scene may hit objects farther away but could also scan over closer objects; the reflection of the higher-powered beam on close objects could overwhelm other signals and beams reflecting off the closer object. In some embodiments, information about positioning of near objects may be provided into the controller to modulate the higher-powered scanning beam or beams. The high-power laser may be modulated to either reduce its power or turn itself completely off if it may be about to scan over a close object. This may be possible since each eye may be well-calibrated with respect to all the other eyes, and so may track if it's beam may be about to come near to other objects in the scene based on known angular parameters of the scanning beam. In some embodiments, the high-powered laser may reduce its power or turn itself off if the close object may be determined to be a person, animal, or other object that may be sensitive to the laser light for eye safety or similar safety concerns. In specific embodiments, eyes with cameras of different FOVs may be used to ensure no objects may be missed in the scene while capturing with high precision. For instance, one or more eyes with wide FOVs may track the entire scene; if an object may be detected at relatively lower fidelity, its position could be communicated to a controller which may the same or other eyes that include cameras that may be foveated or have a much narrower FOV to capture the object. Object capture could occur with either or both of event cameras and frame capture cameras.

In specific embodiments, the robot may be able to use various eyes to capture the scene in superresolution over time. Though multiple eyes may be used to track moving objects, they may also pickup details from the scene that may be slow-moving, or static compared to the robot, particularly as the fovea of various cameras scans across these objects. These additional details may be captured opportunistically as the eyes scan over parts of the scene or may be captured deliberately. Though, in some embodiments, two or more eyes may be assigned for a time to capture and track certain objects, they may not be dedicated to this purpose. On occasion, the foveas of one or more eyes may be directed to scan over the scene in arbitrary paths to build up higher-detailed portions of the scene. Depending on whether other objects or portions of the scene may be moving (or potentially being moved through by the robot), the perception system may devote more or less time to capture these parts of the scene on a regular or irregular basis.

In some embodiments, additional cameras may be used to supplement object data as needed. For example, as mentioned above, foveation in a frame capture camera may be implemented by using two different cameras with different FOVs. Though these may be run at the same frame rate, in some cases the high FOV camera (which therefore catches less fine detail) may be run at a much higher frame rate than the lower FOV camera. Image frames from the higher FOV camera may be used in addition to data from event camera scanned data to improve targeting of objects of interest. This may be additionally useful if objects may be moving outside the range of the normal scanning range of the event cameras, and so may be for some objects the only source of data for targeting the eye rotation for object tracking. In some cases, this data may also be used to trigger a high-power scanning mode of other beam scanners for longer range triangulation.

Though so far only a singular robot has been described, in some embodiments robots may be configured to work in tandem with each other. Other vision systems that scan over objects have limitations if used to scan the same object; in some cases, scanning from one system may interfere with scanning from another system. In some embodiments of the current invention, scanning beams from a second robot may also be used as data sources by a first robot to give additional surface information. In addition, these additional scans may also be used to locate the second robot with respect to the first. In some embodiments, robots may notify each other and start sending object data to one another wirelessly as they interact with their environments. Robots may enter and leave such an ad hoc network as they start viewing portions of the scene that may be seen by more than one robot. In some cases, additional information about objects may be built up that would otherwise not be available; for example, two robots that may be viewing the same object from quite different directions may share information about the portions of the object that they each see, allowing each system to build up a more detailed model of the object from all around.

Although the invention has been discussed with respect to various embodiments, it should be recognized that the invention comprises the novel and non-obvious claims supported by this disclosure. It may be understood that the disclosed embodiments may or may not overlap with each other. Specific different embodiments from different aspects may be combined or practiced separately.

Illustrated Operating Environment

Figure 7:
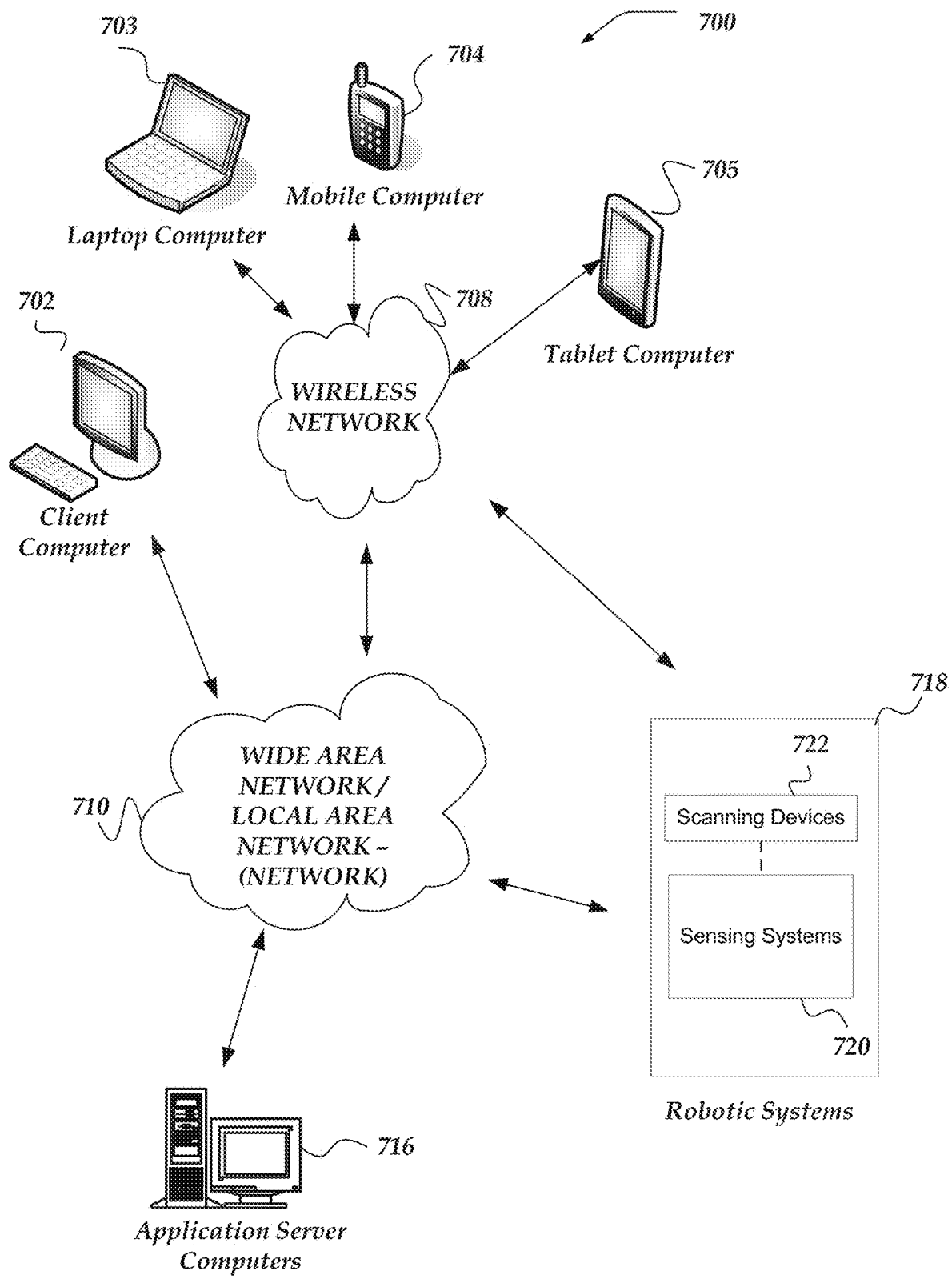
FIG. 7 illustrates a system environment in which various embodiments may be implemented.

FIG. 7 shows components of one embodiment of an environment in which embodiments of the innovations may be practiced. Not all of the components may be required to practice the innovations, and variations in the arrangement and type of the components may be made without departing from the spirit or scope of the innovations. As shown, system 700 of FIG. 7 includes local area networks (LANs)/wide area networks (WANs), such as, network 710, wireless network 708, client computers 702-705, application server computer 716, robotic systems 718, or the like. In some embodiments, robotic systems 718 may include one or more of sensing systems 718, scanning devices 720, or the like.

At least one embodiment of client computers 702-705 is described in more detail below in conjunction with FIG. 8.

In one or more embodiments, at least some of client computers 702-705 may operate over one or more wired or wireless networks, such as networks 708, or 710. Generally, client computers 702-705 may include virtually any computer capable of communicating over a network to send and receive information, perform various online activities, offline actions, or the like. In one embodiment, one or more of client computers 702-705 may be configured to operate within a business or other entity to perform a variety of services for the business or other entity. For example, client computers 702-705 may be configured to operate as a web server, firewall, client application, media player, mobile telephone, game console, desktop computer, or the like. However, client computers 702-705 are not constrained to these services and may also be employed, for example, as for end-user computing in other embodiments. It should be recognized that more or less client computers (as shown in FIG. 7) may be included within a system such as described herein, and embodiments are therefore not constrained by the number or type of client computers employed.

Computers that may operate as client computer 702 may include computers that typically connect using a wired or wireless communications medium such as personal computers, multiprocessor systems, microprocessor-based or programmable electronic devices, network PCs, or the like. In some embodiments, client computers 702-705 may include virtually any portable computer capable of connecting to another computer and receiving information such as, laptop computer 703, mobile computer 704, tablet computers 705, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 702-705 typically range widely in terms of capabilities and features. Moreover, client computers 702-705 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one or more embodiments, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one or more embodiments, a user of the client computer may employ the browser application to perform various activities over a network (online). However, another application may also be used to perform various online activities.

Client computers 702-705 also may include at least one other client application that is configured to receive or send content between another computer. The client application may include a capability to send or receive content, or the like. The client application may further provide information that identifies itself, including a type, capability, name, and the like. In one or more embodiments, client computers 702-705 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 716, robotic systems 718, sensing systems 720, scanning devices 722, or other computers.

Client computers 702-705 may further be configured to include a client application that enables an end-user to log into an end-user account that may be managed by another computer, such as application server computer 716, robotic systems 718, sensing systems 720, scanning devices 722, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by sensing systems 720 or scanning devices 722.

Wireless network 708 is configured to couple client computers 703-705 and its components with network 710. Wireless network 708 may include any of a variety of wireless sub-networks that may further overlay stand-alone ad-hoc networks, and the like, to provide an infrastructure-oriented connection for client computers 703-705. Such sub-networks may include mesh networks, Wireless LAN (WLAN) networks, cellular networks, and the like. In one or more embodiments, the system may include more than one wireless network.

Wireless network 708 may further include an autonomous system of terminals, gateways, routers, and the like connected by wireless radio links, and the like. These connectors may be configured to move freely and randomly and organize themselves arbitrarily, such that the topology of wireless network 708 may change rapidly.

Wireless network 708 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 703-705 with various degrees of mobility. In one non-limiting example, wireless network 708 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 708 may include virtually any wireless communication mechanism by which information may travel between client computers 703-705 and another computer, network, a cloud-based network, a cloud instance, or the like.

Network 710 is configured to couple network computers with other computers, including, application server computer 716, robotic systems 718, sensing systems 720, scanning devices 722, client computers 702, and client computers 703-705 through wireless network 708, or the like. Network 710 is enabled to employ any form of computer readable media for communicating information from one electronic device to another. Also, network 710 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices may be remotely connected to either LANs or WANs via a modem and temporary telephone link. In one or more embodiments, network 710 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of application server computer 716, sensing systems 718 or scanning devices 720 are described in more detail below in conjunction with FIG. 8 or FIG. 9. Although FIG. 7 illustrates application server computer 716, sensing systems 720, and scanning devices 722 each as a single computer, the innovations or embodiments are not so limited. For example, one or more functions of application server computer 716, sensing systems 720, scanning devices 722, or the like, may be distributed across one or more distinct network computers, robot systems, or client computers. Moreover, in one or more embodiments, sensing systems 720 may be implemented using a plurality of network computers. Further, in one or more of the various embodiments, application server computer 716, sensing systems 720, or the like, may be implemented using one or more cloud instances in one or more cloud networks. Also, in some embodiments, application server computer 716, sensing systems 720, and scanning devices 722, or the like, may be included in robotic applications, including stationary (fixed emplacement) robots, mobile robots, or the like, as described herein. Accordingly, these innovations and embodiments are not to be construed as being limited to a single environment, and other configurations, and other architectures are also envisaged.

Illustrative Client Computer

Figure 8:
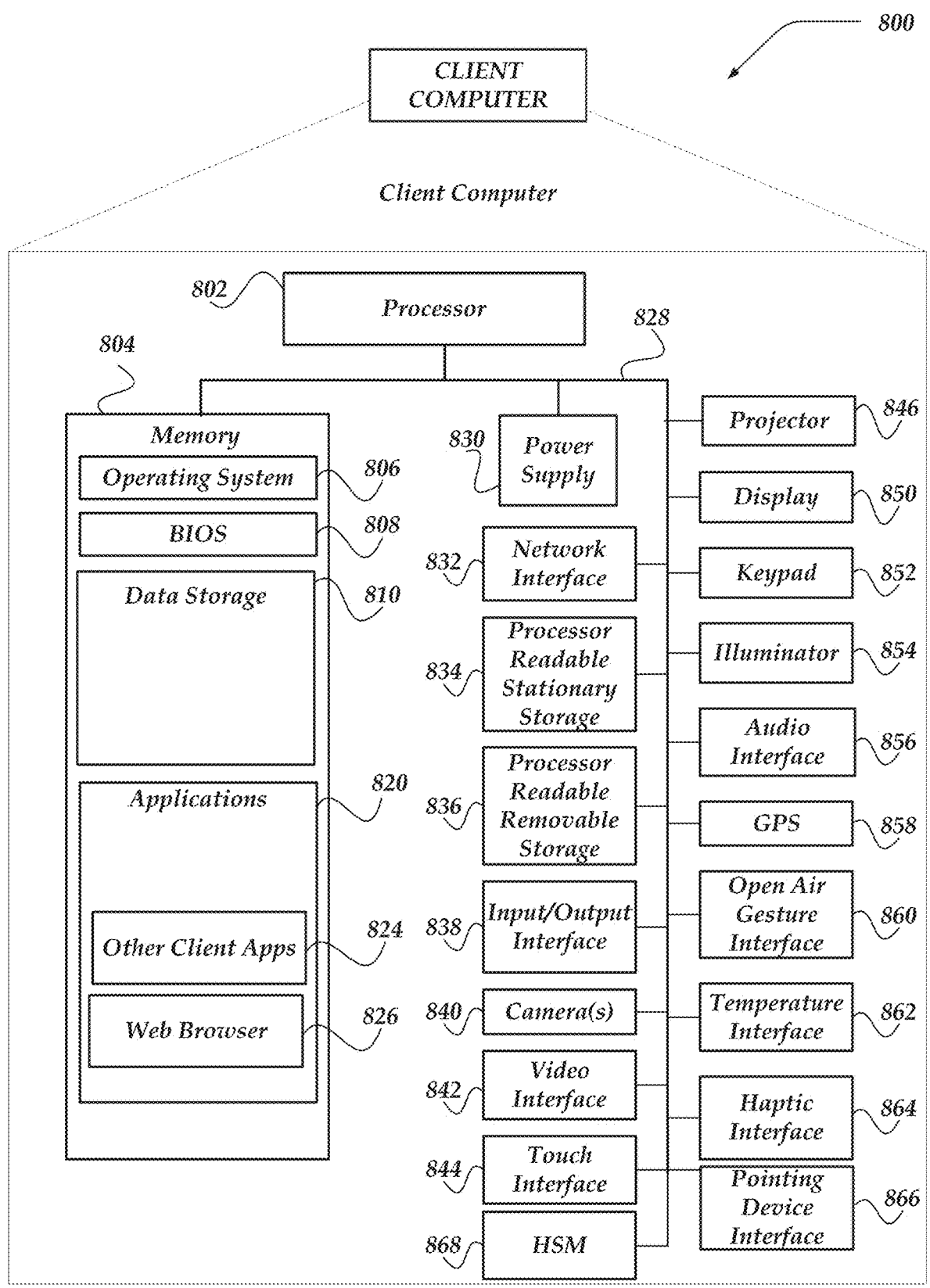
FIG. 8 illustrates a schematic embodiment of a client computer.

FIG. 8 shows one embodiment of client computer 800 that may include many more or less components than those shown. Client computer 800 may represent, for example, one or more embodiments of mobile computers or client computers shown in FIG. 7. Further, scanning devices, mobile phones, scanning devices, or the like, discussed above may be considered client computers that may be arranged in configurations or form factors as described above. In some embodiments, some or all components of client computers, such as client computer 800 may be embedded or included in a robotic system.

Client computer 800 may include processor 802 in communication with memory 804 via bus 828. Client computer 800 may also include power supply 830, network interface 832, audio interface 856, display 850, keypad 852, illuminator 854, video interface 842, input/output interface 838, haptic interface 864, global positioning systems (GPS) receiver 858, open air gesture interface 860, temperature interface 862, camera(s) 840, projector 846, pointing device interface 866, processor-readable stationary storage device 834, and processor-readable removable storage device 836. Client computer 800 may optionally communicate with a base station (not shown), or directly with another computer. And in one or more embodiments, although not shown, a gyroscope may be employed within client computer 800 to measuring or maintaining an orientation of client computer 800.

Power supply 830 may provide power to client computer 800. A rechargeable or non-rechargeable battery may be used to provide power. The power may also be provided by an external power source, such as an AC adapter or a powered docking cradle that supplements or recharges the battery.

Network interface 832 includes circuitry for coupling client computer 800 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 832 is sometimes known as a transceiver, transceiving device, or network interface card (NIC).

Audio interface 856 may be arranged to produce and receive audio signals such as the sound of a human voice. For example, audio interface 856 may be coupled to a speaker and microphone (not shown) to enable telecommunication with others or generate an audio acknowledgement for some action. A microphone in audio interface 856 can also be used for input to or control of client computer 800, e.g., using voice recognition, detecting touch based on sound, and the like.

Display 850 may be a liquid crystal display (LCD), gas plasma, electronic ink, light emitting diode (LED), Organic LED (OLED) or any other type of light reflective or light transmissive display that may be used with a computer. Display 850 may also include a touch interface 844 arranged to receive input from an object such as a stylus or a digit from a human hand, and may use resistive, capacitive, surface acoustic wave (SAW), infrared, radar, or other technologies to sense touch or gestures.

Projector 846 may be a remote handheld projector or an integrated projector that is capable of projecting an image on a remote wall or any other reflective object such as a remote screen.

Also, in some embodiments, if client computer 200 may be a scanning device, projector 846 may include one or more signal beam generators, laser scanner systems, or the like, that may be employed for scanning scene or objects as described above.

Video interface 842 may be arranged to capture video images, such as a still photo, a video segment, an infrared video, or the like. For example, video interface 842 may be coupled to a digital video camera, a web-camera, or the like. Video interface 842 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 852 may comprise any input device arranged to receive input from a user. For example, keypad 852 may include a push button numeric dial, or a keyboard. Keypad 852 may also include command buttons that are associated with selecting and sending images.

Illuminator 854 may provide a status indication or provide light. Illuminator 854 may remain active for specific periods of time or in response to event messages. For example, if illuminator 854 is active, it may backlight the buttons on keypad 852 and stay on while the client computer is powered. Also, illuminator 854 may backlight these buttons in various patterns if particular actions are performed, such as dialing another client computer. Illuminator 854 may also cause light sources positioned within a transparent or translucent case of the client computer to illuminate in response to actions.

Further, client computer 800 may also comprise hardware security module (HSM) 868 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 868 may be a stand-alone computer, in other cases, HSM 868 may be arranged as a hardware card that may be added to a client computer.

Client computer 800 may also comprise input/output interface 838 for communicating with external peripheral devices or other computers such as other client computers and network computers. The peripheral devices may include an audio headset, virtual reality headsets, display screen glasses, remote speaker system, remote speaker and microphone system, and the like. Input/output interface 838 can utilize one or more technologies, such as Universal Serial Bus (USB), Infrared, WiFi, WiMax, Bluetooth™, and the like.

Input/output interface 838 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 800.

Haptic interface 864 may be arranged to provide tactile feedback to a user of the client computer. For example, the haptic interface 864 may be employed to vibrate client computer 800 in a particular way if another user of a computer is calling. Temperature interface 862 may be used to provide a temperature measurement input or a temperature changing output to a user of client computer 800. Open air gesture interface 860 may sense physical gestures of a user of client computer 800, for example, by using single or stereo video cameras, radar, a gyroscopic sensor inside a computer held or worn by the user, or the like. Camera 840 may be used to track physical eye movements of a user of client computer 800.

Further, in some cases, if client computer 800 may be a scanning device, camera 840 may represent one or more event cameras, one or more frame cameras, or the like.

GPS transceiver 858 can determine the physical coordinates of client computer 800 on the surface of the Earth, which typically outputs a location as latitude and longitude values. GPS transceiver 858 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 800 on the surface of the Earth. It is understood that under different conditions, GPS transceiver 858 can determine a physical location for client computer 800. In one or more embodiment, however, client computer 800 may, through other components, provide other information that may be employed to determine a physical location of the client computer, including for example, a Media Access Control (MAC) address, IP address, and the like.

In at least one of the various embodiments, applications, such as, operating system 806, other client apps 824, web browser 826, or the like, may be arranged to employ geo-location information to select one or more localization features, such as, time zones, languages, currencies, calendar formatting, or the like. Localization features may be used in, file systems, user-interfaces, reports, as well as internal processes or databases. In at least one of the various embodiments, geo-location information used for selecting localization information may be provided by GPS 858. Also, in some embodiments, geolocation information may include information provided using one or more geolocation protocols over the networks, such as, wireless network 708 or network 711.

Human interface components can be peripheral devices that are physically separate from client computer 800, allowing for remote input or output to client computer 800. For example, information routed as described here through human interface components such as display 850 or keyboard 852 can instead be routed through network interface 832 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which may include a remote pico projector along with one or more cameras that remotely communicate with a separately located client computer to sense a user's gestures toward portions of an image projected by the pico projector onto a reflected surface such as a wall or the user's hand.

A client computer may include web browser application 826 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 804 may include RAM, ROM, or other types of memory. Memory 804 illustrates an example of computer-readable storage media (devices) for storage of information such as computer-readable instructions, data structures, program modules or other data. Memory 804 may store BIOS 808 for controlling low-level operation of client computer 800. The memory may also store operating system 806 for controlling the operation of client computer 800. It may be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 804 may further include one or more data storage 810, which can be utilized by client computer 800 to store, among other things, applications 820 or other data. For example, data storage 810 may also be employed to store information that describes various capabilities of client computer 800. The information may then be provided to another device or computer based on any of a variety of methods, including being sent as part of a header during a communication, sent upon request, or the like. Data storage 810 may also be employed to store social networking information including address books, buddy lists, aliases, user profile information, or the like. Data storage 810 may further include program code, data, algorithms, and the like, for use by a processor, such as processor 802 to execute and perform actions. In one embodiment, at least some of data storage 810 may also be stored on another component of client computer 800, including, but not limited to, non-transitory processor-readable removable storage device 836, processor-readable stationary storage device 834, or even external to the client computer.

Applications 820 may include computer executable instructions which, if executed by client computer 800, transmit, receive, or otherwise process instructions and data. Applications 820 may include, for example, other client applications 824, web browser 826, or the like. Client computers may be arranged to exchange communications, such as, queries, searches, messages, notification messages, event messages, sensor events, alerts, performance metrics, log data, API calls, or the like, combination thereof, with application servers or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 800 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 800 may include one or more hardware microcontrollers instead of CPUs. In one or more embodiment, the one or more microcontrollers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 9:
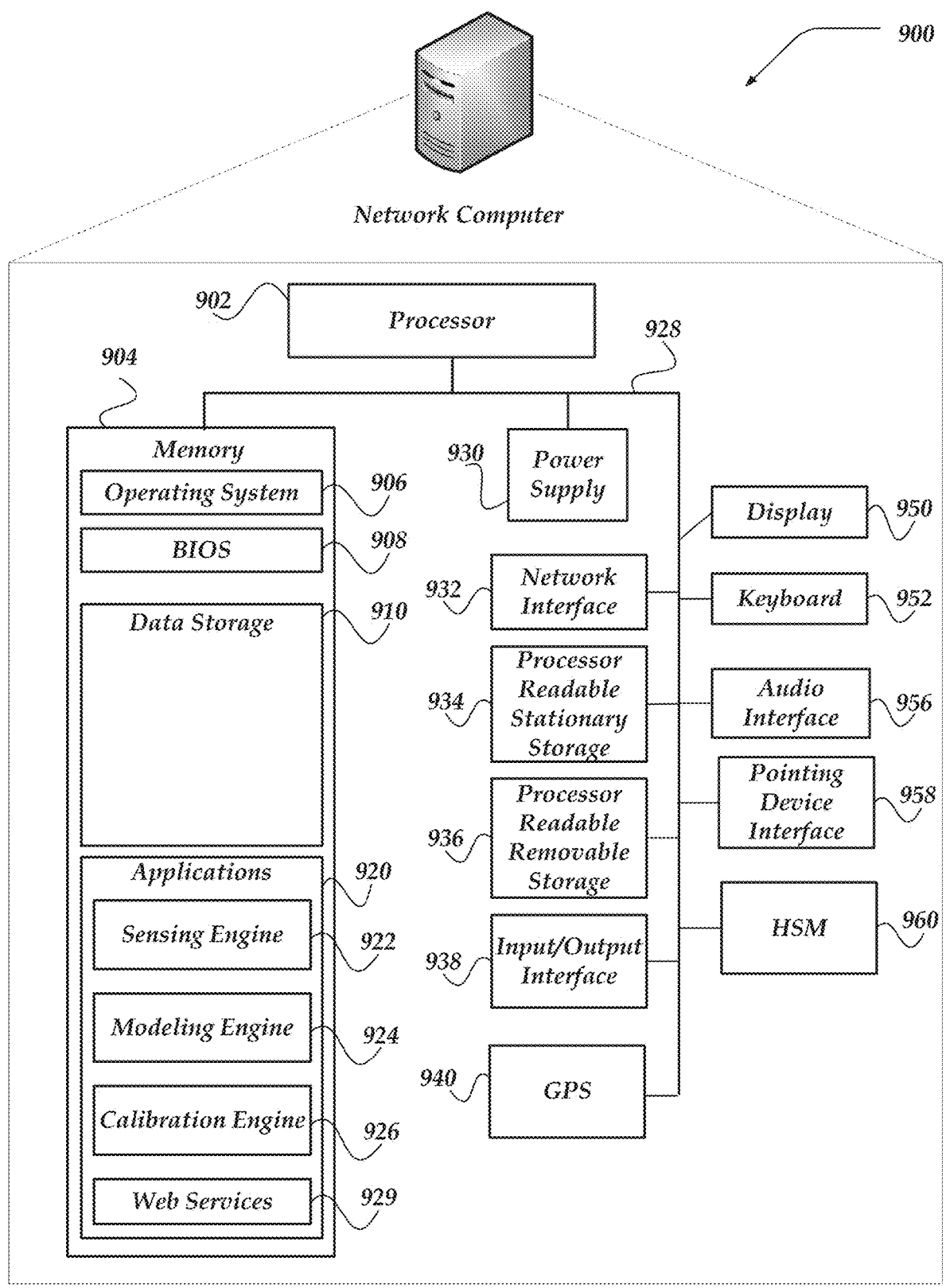
FIG. 9 illustrates a schematic embodiment of a network computer.

FIG. 9 shows one embodiment of network computer 900 that may be included in a system implementing one or more of the various embodiments. Network computer 900 may include many more or less components than those shown in FIG. 9. However, the components shown are sufficient to disclose an illustrative embodiment for practicing these innovations. Network computer 900 may represent, for example, one embodiment of at least one of application server computer 716, or sensing systems 720 of FIG. 7. In some embodiments, network computers or portions thereof may be embedded or included in robotic systems.

In one or more of the various embodiments, scanning devices, sensing systems, robotic systems, mobile computers, or mobile phones may be arranged to communicate with one or more network computers, such as, network computer 900. In some embodiments, network computers may provide: software/firmware updates; backup storage; communication between or among scanning devices, robotic systems, mobile computers; or the like. In some cases, network computer 900 may be considered part of a cloud-based system that provides computational support for scanning devices, sensing systems, robotics systems, or the like.

Network computers, such as, network computer 900 may include a processor 902 that may be in communication with a memory 904 via a bus 928. In some embodiments, processor 902 may be comprised of one or more hardware processors, or one or more processor cores. In some cases, one or more of the one or more processors may be specialized processors designed to perform one or more specialized actions, such as, those described herein. Network computer 900 also includes a power supply 930, network interface 932, audio interface 956, display 950, keyboard 952, input/output interface 938, processor-readable stationary storage device 934, and processor-readable removable storage device 936. Power supply 930 provides power to network computer 900.

Network interface 932 includes circuitry for coupling network computer 900 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 932 is sometimes known as a transceiver, transceiving device, or network interface card (NIC). Network computer 900 may optionally communicate with a base station (not shown), or directly with another computer.

Audio interface 956 is arranged to produce and receive audio signals such as the sound of a human voice. For example, audio interface 956 may be coupled to a speaker and microphone (not shown) to enable telecommunication with others or generate an audio acknowledge for some action. A microphone in audio interface 956 can also be used for input to or control of network computer 900, for example, using voice recognition.

Display 950 may be a liquid crystal display (LCD), gas plasma, electronic ink, light emitting diode (LED), Organic LED (OLED) or any other type of light reflective or light transmissive display that can be used with a computer. In some embodiments, display 950 may be a handheld projector or pico projector capable of projecting an image on a wall or other object.

Network computer 900 may also comprise input/output interface 938 for communicating with external devices or computers not shown in FIG. 9. Input/output interface 938 can utilize one or more wired or wireless communication technologies, such as, USB™, Firewire™, WiFi, WiMax, Thunderbolt™, Infrared, Bluetooth™, Zigbee™, serial port, parallel port, and the like.

Also, input/output interface 938 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 900. Human interface components may be physically separate from network computer 900, allowing for remote input or output to network computer 900. For example, information routed as described here through human interface components such as display 950 or keyboard 952 can instead be routed through the network interface 932 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 958 to receive user input.

GPS transceiver 940 can determine the physical coordinates of network computer 900 on the surface of the Earth, which typically outputs a location as latitude and longitude values. GPS transceiver 940 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 900 on the surface of the Earth. It is understood that under different conditions, GPS transceiver 940 can determine a physical location for network computer 900. In one or more embodiments, however, network computer 900 may, through other components, provide other information that may be employed to determine a physical location of the client computer, including for example, a Media Access Control (MAC) address, IP address, and the like.

In at least one of the various embodiments, applications, such as, operating system 906, sensing engine 922, modeling engine 924, calibration engine 926, web services 929, or the like, may be arranged to employ geo-location information to select one or more localization features, such as, time zones, languages, currencies, currency formatting, calendar formatting, or the like. Localization features may be used in file systems, user-interfaces, reports, as well as internal processes or databases. In at least one of the various embodiments, geo-location information used for selecting localization information may be provided by GPS 940. Also, in some embodiments, geolocation information may include information provided using one or more geolocation protocols over the networks, such as, wireless network 108 or network 111.

Memory 904 may include Random Access Memory (RAM), Read-Only Memory (ROM), or other types of memory. Memory 904 illustrates an example of computer-readable storage media (devices) for storage of information such as computer-readable instructions, data structures, program modules or other data. Memory 904 stores a basic input/output system (BIOS) 908 for controlling low-level operation of network computer 900. The memory also stores an operating system 906 for controlling the operation of network computer 900. It may be appreciated that this component may include a general-purpose operating system such as a version of UNIX®, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 904 may further include one or more data storage 910, which can be utilized by network computer 900 to store, among other things, applications 920 or other data. For example, data storage 910 may also be employed to store information that describes various capabilities of network computer 900. The information may then be provided to another device or computer based on any of a variety of methods, including being sent as part of a header during a communication, sent upon request, or the like. Data storage 910 may also be employed to store social networking information including address books, buddy lists, aliases, user profile information, or the like. Data storage 910 may further include program code, data, algorithms, and the like, for use by a processor, such as processor 902 to execute and perform actions such as those actions described below. in one or more embodiments, at least some of data storage 910 may also be stored on another component of network computer 900, including, but not limited to, non-transitory media inside processor-readable removable storage device 936, processor-readable stationary storage device 934, or any other computer-readable storage device within network computer 900, or even external to network computer 900.

Applications 920 may include computer executable instructions which, if executed by network computer 900, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 920 may include sensing engine 922, modeling engine 924, calibration engine 926, web services 929, or the like, which may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, sensing engine 922, modeling engine 924, calibration engine 926, web services 929, or the like, may be operative in a cloud-based computing environment. In one or more of the various embodiments, these applications, and others, which comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to sensing engine 922, modeling engine 924, calibration engine 926, web services 929, or the like, may be provisioned and de-commissioned automatically.

Also, in one or more of the various embodiments, sensing engine 922, modeling engine 924, calibration engine 926, web services 929, or the like, may be located in virtual servers running in a cloud-based computing environment rather than being tied to one or more specific physical network computers.

Further, network computer 900 may also comprise hardware security module (HSM) 960 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 960 may be a stand-alone network computer, in other cases, HSM 960 may be arranged as a hardware card that may be installed in a network computer.

Additionally, in one or more embodiments (not shown in the figures), network computer 900 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Figure 10:
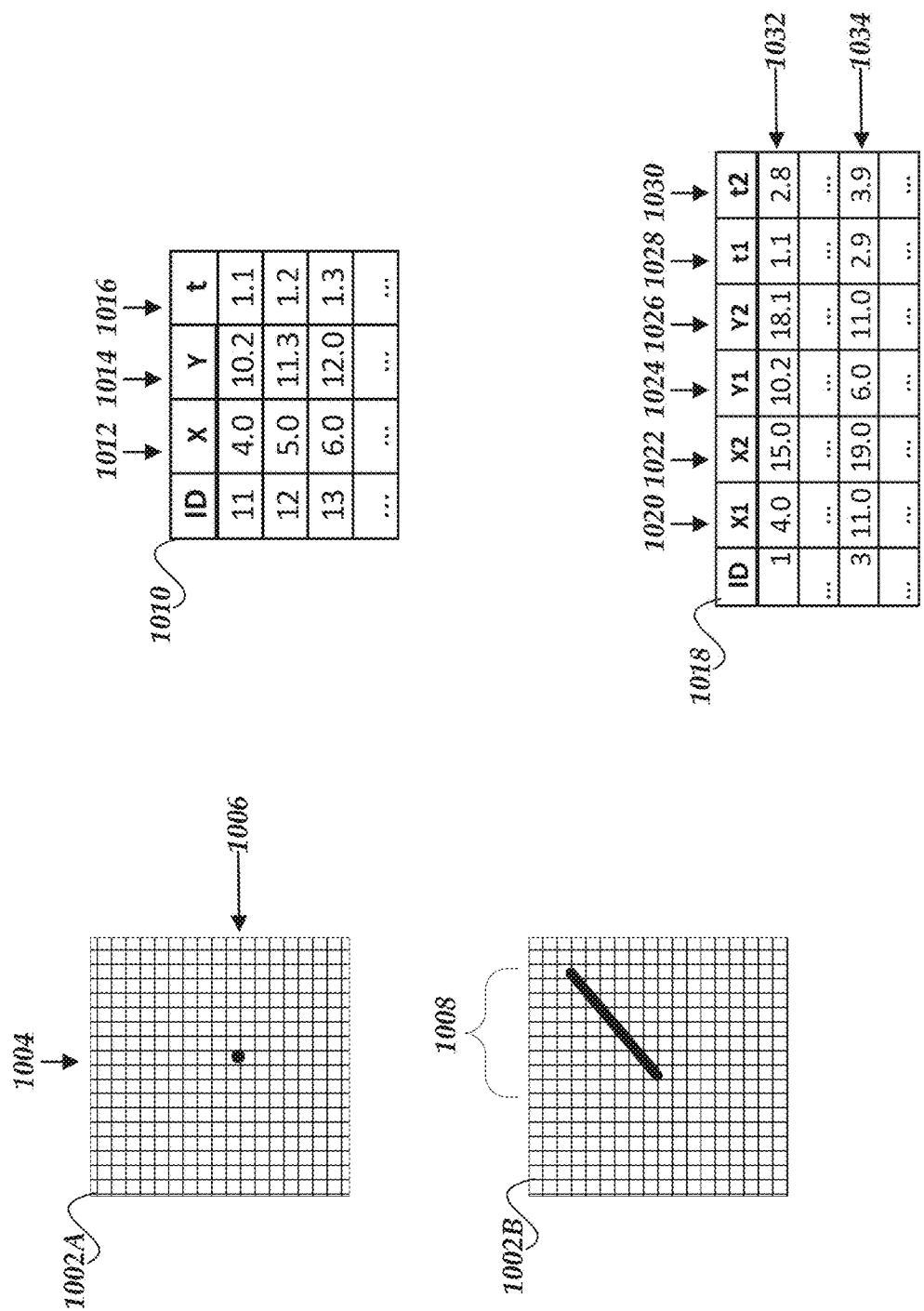
FIG. 10 illustrates a logical representation of sensors and sensor output information for foveated robotic vision system in accordance with one or more of the various embodiments.

FIG. 10 illustrates a logical representation of sensors and sensor output information for foveated robotic vision system in accordance with one or more of the various embodiments.

In one or more of the various embodiments, sensing engines running on scanning devices or in robotic systems, such as, eye 120 may be provided sensor output from various sensors. In this example, for some embodiments, sensor 1002A may be considered to represent a generic sensor that may emit signals that correspond to the precise location on the sensor where reflected energy from the scanning signal generator may be detected. For example, sensor 1002A may be considered an array of detector cells that reports the cell location of the cell that has detected energy reflected from the scanning signal generator. In this example, horizontal location 1004 and vertical location 1006 may be considered to represent a location corresponding to the location in sensor 1002 where reflected signal energy has been detected. Accordingly, sensor 1002 may be considered a sensor that may be part of an event camera that may be included in a scanning device, such as, eye 120, or the like, where the signal energy may be provided scanning lasers and the reflect signal energy may be considered the laser light that may be reflected from one or more objects or surfaces in the scene.

In one or more of the various embodiments, sensing engines may be arranged to receive sensor information for one or more detection events from one or more sensors. Accordingly, in some embodiments, sensing engines may be arranged to determine additional information about the source of the reflected energy (beam location on scanned surface) based on triangulation or other methods. In some embodiments, if sensing engines employ triangulation or other methods to locate the location of the signal beam in the scanning environment, the combined sensor information may be considered a single sensor event comprising a horizontal (x) location, vertical location (y) and time component (t). Also, in some embodiments, sensor events may include other information, such as, time-of-flight information depending on the type or capability of the sensors.

Further, as described above, the scanning signal generator (e.g., scanning laser) may be configured to traverse a known precise path/curve (e.g., scanning path). Accordingly, in some embodiments, the pattern or sequence of cells in the sensors that detect reflected energy may follow a path/curve that is related to the path/curve of the scanning signal generator. Accordingly, in some embodiments, if the signal generator scans a particular path/curve a related path/curve of activated cells in the sensors may be detected. Thus, in this example, for some embodiments, path 1008 may represent a sequence of cells in sensor 1002B that have detected reflected energy from the scanning signal generator.

In one or more of the various embodiments, sensing engines may be arranged to fit sensor events to the scanning path curve. Accordingly, in one or more of the various embodiments, sensing engines may be arranged to predict where sensor events should occur based on the scanning path curve to determine information about the location or orientation of scanned surfaces or objects. Thus, in some embodiments, if sensing engines receive sensor events that are unassociated with the known scanning path curve, sensing engines may be arranged to perform various actions, such as, closing the current trajectory and beginning a new trajectory, discarding the sensor event as noise, or the like.

In one or more of the various embodiments, scanning path curves may be configured in advance within the limits or constraints of the scanning signal generator and the sensors. For example, a scanning signal generator may be configured or directed to scan the scanning environment using various curves including Lissajous curves, 2D lines, or the like. In some cases, scanning path curves may be considered piecewise functions in that they may change direction or shape at different parts of the scan. For example, a 2D line scan path may be configured to change direction if the edge of the scanning environment (e.g., field-of-view) is approached.

One of ordinary skill in the art will appreciate that if an unobstructed surface is scanned, the scanning frequency, scanning path, and sensor response frequency may determine if the sensor detection path appears as a continuous path. Thus, the operational requirements of the scanning signal generator, sensor precision, sensor response frequency, or the like, may vary depending on application of the system. For example, if the scanning environment may be relatively low featured and static, the sensors may have a lower response time because the scanned environment is not changing very fast. Also, for example, if the scanning environment is dynamic or includes more features of interest, the sensors may require increased responsiveness or precision to accurately capture the paths of the reflected signal energy. Further, in some embodiments, the characteristics of the scanning signal generator may vary depending on the scanning environment. For example, if lasers are used for the scanning signal generator, the energy level, wavelength, phase, beam width, or the like, may be tuned to suit the environment.

In one or more of the various embodiments, sensing engines may be provided sensor output as a continuous stream of sensor events or sensor information that identifies the cell location in the sensor cell-array and a timestamp that corresponds to if the detection event occurred.

In this example, for some embodiments, data structure 1010 may be considered a data structure for representing sensor events based on sensor output provided to a sensing engine. In this example, column 1012 represents the horizontal position of the location in the scanning environment, column 1014 represents a vertical position in the scanning environment, and column 1016 represents the time of the event. Accordingly, in some embodiments, sensing engines may be arranged to determine which (if any) sensor events should be associated with a trajectory. In some embodiments, sensing engines may be arranged to associate sensor events with existing trajectories or create new trajectories. In some embodiments, if the sensor events fit an expected/predicted curve as determined based on the scanning path curve, sensing engines may be arranged to associate the sensor events with an existing trajectory or create a new trajectory. Also, in some cases, for some embodiments, sensing engines may be arranged to determine one or more sensor event as noise if their location deviates from a predicted path beyond a defined threshold value.

In one or more of the various embodiments, sensing engines may be arranged to determine sensor events for each individual sensor rather than being limited to provide sensor events computed based on outputs from multiple sensors. For example, in some embodiments, sensing engines may be arranged to provide a data structure similar to data structure 1010 to collect sensor events for individual sensors.

In some embodiments, sensing engines may be arranged to generate a sequence of trajectories that correspond to the reflected energy/signal paths detected by the sensors. In some embodiments, sensing engines may be arranged to employ one or more data structures, such as, data structure 1018 to represent a trajectory that may be determined based on the information captured by the sensors. In this example, data structure 1010 may be table-like structure that includes columns, such as, column 1020 for storing a first x-position, column 1022 for storing a second x-position, column 1024 for storing a first y-position, column 1026 for storing a second y-position, column 1028 for storing the beginning time of a trajectory, column 1030 for storing an end time of a trajectory, of the like.

In this example, row 1032 represents information for a first trajectory and row 1034 represents information for another trajectory. As described herein, sensing engines may be arranged to employ one or more rules or heuristics to determine if one trajectory ends and another begins. In some embodiments, such heuristics may include observing the occurrence sensor events that are geometrically close or temporally close. Note, the particular components or elements of a trajectory may vary depending on the parametric representation of the analytical curve or the type of analytical curve associated with the scanning path and the shape or orientation of the scanned surfaces. Accordingly, one of ordinary skill in the art will appreciate that different types of analytical curves or curve representations may result in more or fewer parameters for each trajectory. Thus, in some embodiments, sensing engines may be arranged to determine the specific parameters for trajectories based on rules, templates, libraries, or the like, provided via configuration information to account for local circumstances or local requirements.

Further, one of ordinary skill in the art will appreciate that in some embodiments, trajectories may be projected/converted into 3-D scene coordinates based on calibration information, such as, the position or orientation of sensors, signal generators (e.g., scanning lasers), or the like.

In one or more of the various embodiments, trajectories may be represented using curve parameters rather than a collection of individual points or pixels. Accordingly, in some embodiments, sensing engines may be arranged to employ one or more numerical methods to continuously fit sequences of sensor events to scanning path curves.

Further, in some embodiments, sensing engines may be arranged to employ one or more smoothing methods to improve the accuracy of trajectories or trajectory fitting. For example, in some embodiments, the scanning curve may be comprised of sensor events triggered by a scanning laser that may not be one cell wide because in some cases reflected energy may splash to neighboring cells or land on the border of two or more cells. Accordingly, in some embodiments, to better estimate the real position of the reflected signal beam as it traverses the sensor plane, sensing engines may be arranged to perform an online smoothing estimate, e.g., using a Kalman filter to predict a position in a trajectory in fractional units of detector cell position and fractional units of the fundamental timestamp of the sensor. Also, in some embodiments, sensing engines may be arranged to employ a batch-based optimization routine such as weighted least squares to fit a smooth curve to continuous segments of the scanning trajectory, which may correspond to if the scanning signal generator beam was scanning over a continuous surface.

Also, in some embodiments, the scanning path may be employed to determine if trajectories begin or end. For example, if the scanning path reaches an edge of a scanning area and changes direction, in some cases, a current trajectory may be terminated while a new trajectory may be started to begin capturing information based on the new direction of the scan. Also, in some embodiments, objects or other features that occlude or obstruct scanning energy or reflected scanning energy may result in breaks in the sensor output that introduce gaps or other discontinuities that may trigger a trajectory to be closed and another trajectory to be opened subsequent to the break or gap. Further, in some embodiments, sensing engines may be configured to have a maximum length of trajectories such that a trajectory may be closed if it has collected enough sensor events or enough time has elapsed from the start of the trajectory.

Also, in some embodiments, sensing engines may be arranged to determine trajectories for individual sensor. Accordingly, in some embodiments, sensing engines may be arranged to provide data structures similar to data structure 1018 for each sensor. Thus, the relative position information for different sensors or different collections of the data may be used to compute 3-D coordinates for events or trajectories.

Figure 11:
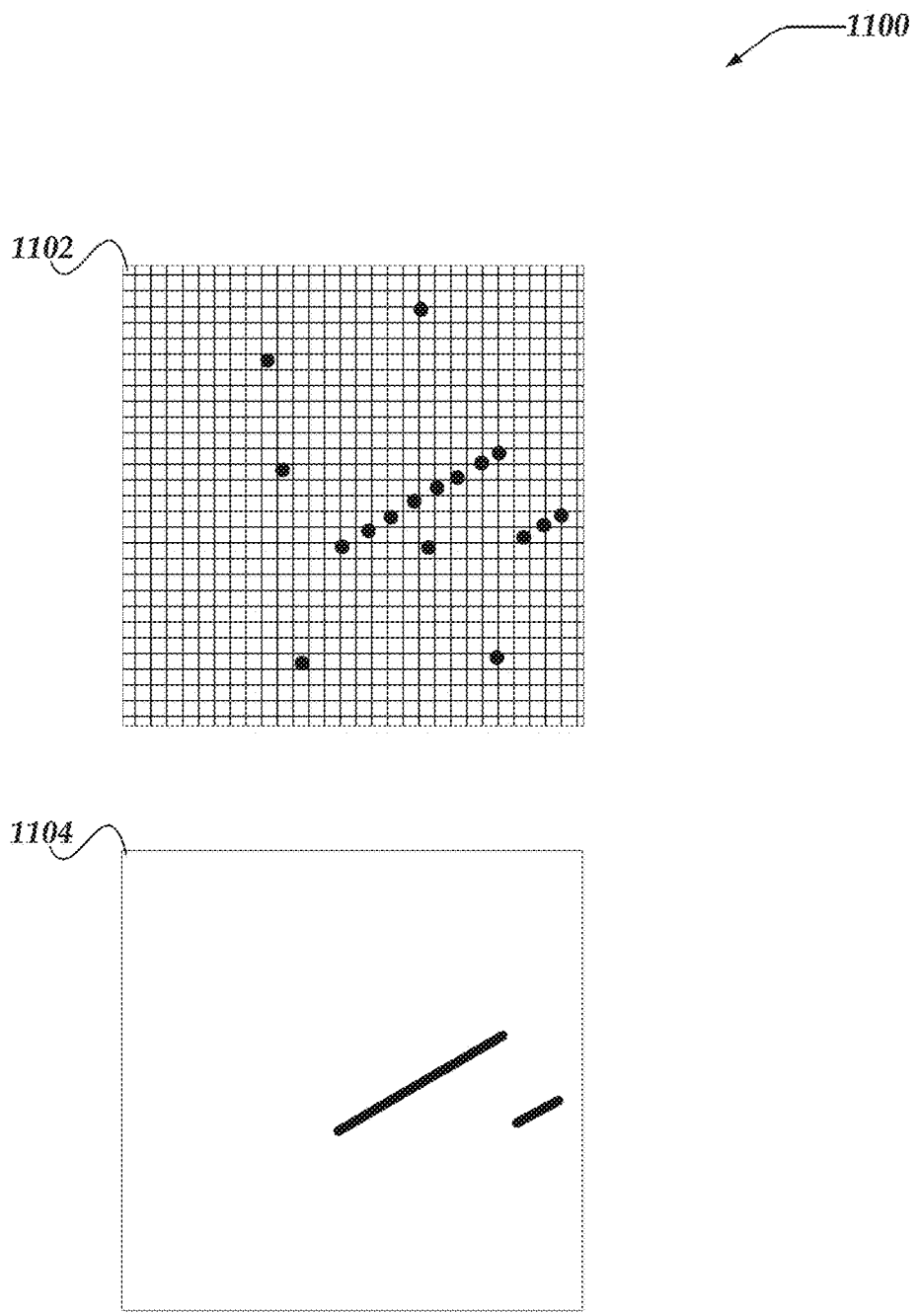
FIG. 11 illustrates a logical schematic of a system for foveated robotic vision system in accordance with one or more of the various embodiments.

FIG. 11 illustrates a logical schematic of system 1100 for foveated robotic vision system in accordance with one or more of the various embodiments. As described above, in some embodiments, scanning signal generators may scan for surfaces in scanning environments. In some cases, conditions of the scanning environment or characteristics of the scanned surfaces may result in one or more spurious sensor events (e.g., noise) generated by one or more sensors. For example, sensor view 1102 represents a portion of sensor events that may be generated during a scan.

In conventional machine vision applications, one or more 2D filters may be applied to a captured video image, point clusters, or the like, to attempt to separate noise events from the signals of interest. In some cases, conventional 2D image-based filters may be disadvantageous because they may employ one or more filters (e.g., weighted moving averaging, Gaussian filters, or the like) that may rely on statistical evaluation of pixel color/weight, pixel color/weight gradients, pixel distribution/clustering, or the like. Accordingly, in some cases, conventional 2D image filtering may be inherently fuzzy and highly dependent on application/environmental assumptions. Also, in some cases, conventional noise detection/noise reduction methods may erroneously miss some noise events while at the same time misclassifying one or more scene events as noise.

In contrast, in some embodiments, sensing engines may be arranged to associate sensor events into trajectories based on precise heuristics, such as, nearness in time and location that may be used to fit sensor events to analytical curves that may be predicted based on the scanning path. Because scanning paths are defined in advance, sensing engines may be arranged to predict which sensor events should be included in the same trajectory. See, trajectory view 1104.

Further, in some embodiments, if surface or object features create gaps or breaks in trajectories, sensing engines may be arranged to close the current trajectory and start a new trajectory as soon as one may be recognized.

Also, in some embodiments, sensing engines may be arranged to determine trajectories directly from sensor events having the form (x, y, t) rather than employing fuzzy pattern matching or pattern recognition methods. Thus, in some embodiments, sensing engines may be arranged to accurately compute distance, direction, or the like, rather than relying fuzzy machine vision methods to distinguish noise from sensor events that should be in the same trajectory.

In one or more of the various embodiments, calibration engines associated with sensing engines or scanning devices may be arranged to employ rules, instructions, heuristics, or the like, for classifying sensor events as noise that may be provided via configuration information to account for local requirements or local circumstances that may be associated with a sensing applications or sensors.

Figure 12:
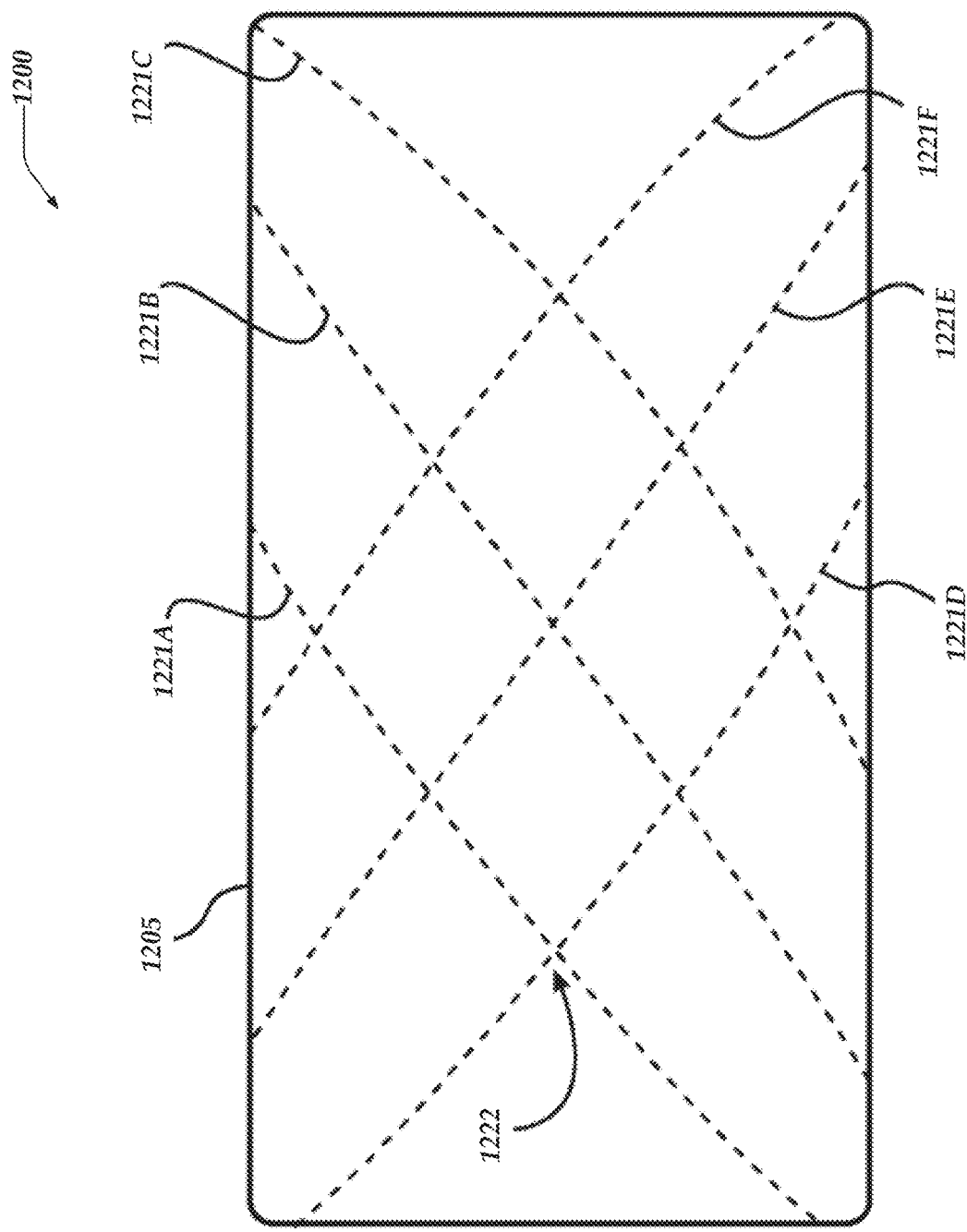
FIG. 12 illustrates how paths associated with scanned beams may traverse over or across a scene in accordance with one or more of the various embodiments.

FIG. 12 illustrates how paths associated with scanned beams may traverse over or across a scene. In this example, scene 1205 represents a scanned surface or area displaying paths 1221A, 1221B, 1221C, 1221D, 1221E, and 1221F, which comprise a subset of the paths on the surface of scene 1205 in accordance with one or more of the various embodiments. A continuous portion of the path may be defined relative to parameters set on event sensors includes in robot eye, such as, eye 120, or the like; although continuous paths may be defined in many ways, one way may be that neighboring or near events on a contiguous path as detected by an event sensor may be less than an arbitrary distance away from the preceding event on the path both spatially as well as in time, and generally may be produced by tracing a path on an object over a surface without significant discontinuities. In some embodiments, sensing systems may be arranged to employ rules, instructions, or the like, for determining trajectories or paths from events that may be provided via configuration information to account for local requirements or local circumstances.

In this example, crossing point 1222 may be representative of many crossing points that may occur during the scanning of an object or scene, and may be a point used as an artificial fiducial point. Though not all crossing points in FIG. 12 may be labeled as such, crossing points may be referred to by the paths which cross. For instance, point 1222 may also be named crossing point 1221AD, as this may be the crossing point of the paths 1221A and 1221D. Other crossing points may be referred to in a similar manner. For clarity, paths 1221A-F as shown may be representative of the path of a signal generator beam as it intersects the surface of an object or scene. Accordingly, events as measured on sensors included in a robot may measure these paths, but may be detected as tilted or skewed differently, since the paths as seen on each sensor may be from the perspective of the sensor in its position.

Figure 13:
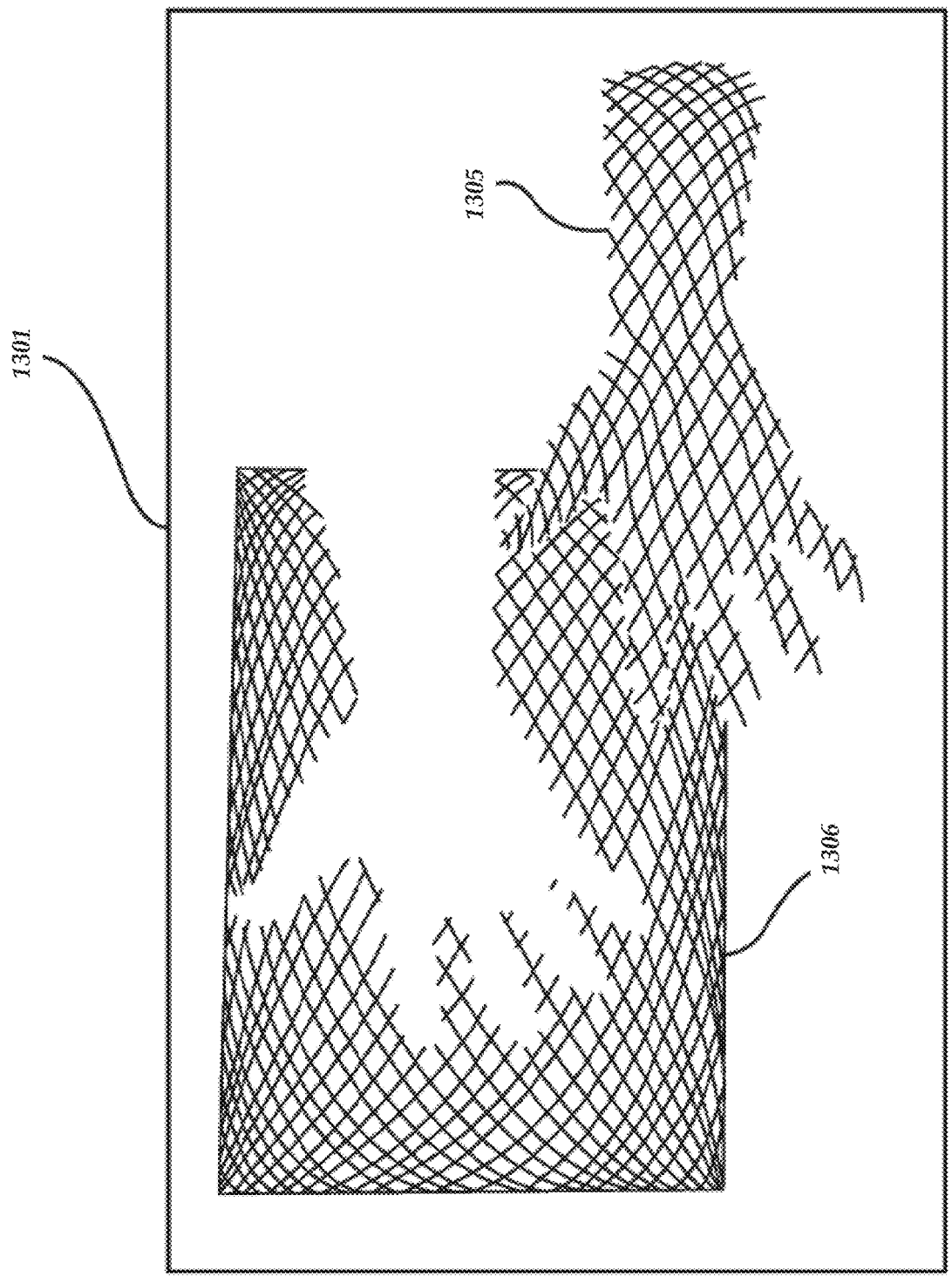
FIG. 13 illustrates a representation of how the shape or position of trajectories may correspond to the shapes or positions of subjects that may be scanned in scenes in accordance with one or more of the various embodiments.

FIG. 13 illustrates a representation of how the shape or position of trajectories may correspond to the shapes or positions of subjects that may be scanned in scenes in accordance with one or more of the various embodiments. It this example, scene 1301 may be scanned by beam generators, such as, laser beams from a robot, or otherwise. Accordingly, in some embodiments, a pattern of paths may be scanned across surface 1306. Also, in this example, shape 1305 may be distinguished from the background scene based on deformations or translations in the trajectories (e.g., paths) that result from the shape or position of the shape 1305 as compared to the background or other shapes that may be included in scene.

Also, this will be understood that each block (or step) in each flowchart illustration, and combinations of blocks in each flowchart illustration, may be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as may arise in a multi-processor computer system. In addition, one or more blocks or combinations of blocks in each flowchart illustration may also be performed concurrently with other blocks or combinations of blocks, or even in a different sequence than illustrated without departing from the scope or spirit of the innovations.

Accordingly, each block (or step) in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, may be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the innovations.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

Further, in some cases, for brevity or clarity, signal generators may be referred to above as lasers, scanning lasers, beams, or the like. Accordingly, one of ordinary skill in the art will appreciate that such specific references may be considered to be signal generators. Likewise, in some cases, sensors, event sensors, image sensors, or the like, may be referred to as cameras, event cameras, image cameras, frame capture cameras, or the like. Accordingly, one of ordinary skill in the art will appreciate that such specific references may be considered to be sensors, event sensors, image sensors, or the like.

What is claimed as new and desired to be protected by Letters Patent of the United States is:

1. A method for sensing objects using one or more processors to execute instructions that are configured to cause actions, comprising:
   providing one or more enclosures that each include one or more of one or more event cameras, one or more beam generators, or one or more frame cameras, wherein one or more of the one or more event cameras or the one or more frame cameras are arranged to provide foveated resolution, and wherein the one or more beam generators scan a scene with one or more beams;
   scanning a plurality of paths across one or more objects in the scene with the one or more beams;
   determining a plurality of events based on detection of one or more beam reflections corresponding to one or more objects in the scene;
   determining a plurality of trajectories based on the plurality of paths and the plurality of events, wherein each trajectory is a parametric representation of a one-dimensional curve segment in a three-dimensional space;
   rotating the one or more enclosures to orient an optical axis of at least one of the frame cameras or event cameras into a physical position for continued scanning of the one or more objects within the FOV based on one or more directions of travel for the one or more objects, wherein a fovea of the one or more frame cameras is moved to position the one or more objects in a center of one or more sensors of the one or more frame cameras; and wherein the one or more frame cameras capture one or more images with the one or more objects centered in the one or more captured images; and
   employing one or more of the plurality of trajectories to determine the one or more directions of travel for the one or more objects.

2. The method of claim 1, wherein detecting the one or more beam reflections, further comprises:
   detecting the one or more beam reflections by the one or more event cameras included in the one or more enclosures.

3. The method of claim 1, wherein providing the one or more of the one or more event cameras or the one or more frame cameras, further comprises:
   providing the one or more of the one or more event cameras or the one or more frame cameras that have a pixel density that is higher at a center of a sensor of the one or more of the one or more event cameras or the one or more frame cameras, wherein the pixel density is gradually decreasing towards the periphery of the sensor of the one or more of the one or more event cameras or the one or more frame cameras.

4. The method of claim 1, wherein the one or more event cameras or the one or more frame cameras, further comprises:
   integrating one or more foveation lenses into focusing optics of the one or more of the one or more event cameras or the one or more frame cameras, wherein the one or more foveation lenses spread out a light field coming into a center of one or more sensors of the one or more of the one or more event cameras or the one or more frame cameras to achieve a foveated effect.

5. The method of claim 1, wherein the one or more event cameras or the one or more frame cameras, further comprises:
   providing two or more event cameras or two or more frame cameras, wherein the two or more event cameras or two or more frame cameras have different resolutions or different fields-of-views.

6. The method of claim 1, further comprising:
   providing a light source that is separate from the one or more beam scanners that emits a beam of light centered around the aperture for one or more of the one or more enclosures;
   detecting one or more edges of the one or more objects based on a portion of the one or more events that correspond to the one or more edges of the one or more objects interrupting the beam of light; and
   employing one or more positions of the one or more edges to predict subsequent motion of the one or more objects.

7. The method of claim 1, further comprising:
   associating one or more portions of the one or more enclosures with one or more portions of the one or more objects, wherein each portion of the one or more enclosures tracks the one or more portions of the objects respectively.

8. A processor readable non-transitory storage media that includes instructions for sensing objects, wherein execution of the instructions by one or more processors on one or more network computers performs actions, comprising:
   providing one or more enclosures that each include one or more of one or more event cameras, one or more beam generators, or one or more frame cameras, wherein one or more of the one or more event cameras or the one or more frame cameras are arranged to provide foveated resolution, and wherein the one or more beam generators scan a scene with one or more beams;
   scanning a plurality of paths across one or more objects in the scene with the one or more beams;
   determining a plurality of events based on detection of one or more beam reflections corresponding to one or more objects in the scene;
   determining a plurality of trajectories based on the plurality of paths and the plurality of events, wherein each trajectory is a parametric representation of a one-dimensional curve segment in a three-dimensional space;
   rotating the one or more enclosures to orient an optical axis of at least one of the frame cameras or event cameras into a physical position for continued scanning of the one or more objects within the FOV based on one or more directions of travel for the one or more objects, wherein a fovea of the one or more frame cameras is moved to position the one or more objects in a center of one or more sensors of the one or more frame cameras; and wherein the one or more frame cameras capture one or more images with the one or more objects centered in the one or more captured images; and
   employing one or more of the plurality of trajectories to determine the one or more directions of travel for the one or more objects.

9. The media of claim 8, wherein detecting the one or more beam reflections, further comprises:
   detecting the one or more beam reflections by the one or more event cameras included in the one or more enclosures.

10. The media of claim 8, wherein providing the one or more of the one or more event cameras or the one or more frame cameras, further comprises:
    providing the one or more of the one or more event cameras or the one or more frame cameras that have a pixel density that is higher at a center of a sensor of the one or more of the one or more event cameras or the one or more frame cameras, wherein the pixel density is gradually decreasing towards the periphery of the sensor of the one or more of the one or more event cameras or the one or more frame cameras.

11. The media of claim 8, wherein the one or more event cameras or the one or more frame cameras, further comprises:
    integrating one or more foveation lenses into focusing optics of the one or more of the one or more event cameras or the one or more frame cameras, wherein the one or more foveation lenses spread out a light field coming into a center of one or more sensors of the one or more of the one or more event cameras or the one or more frame cameras to achieve a foveated effect.

12. The media of claim 8, wherein the one or more event cameras or the one or more frame cameras, further comprises:
    providing two or more event cameras or two or more frame cameras, wherein the two or more event cameras or two or more frame cameras have different resolutions or different fields-of-views.

13. The media of claim 8, further comprising:
    providing a light source that is separate from the one or more beam scanners that emits a beam of light centered around the aperture for one or more of the one or more enclosures;
    detecting one or more edges of the one or more objects based on a portion of the one or more events that correspond to the one or more edges of the one or more objects interrupting the beam of light; and
    employing one or more positions of the one or more edges to predict subsequent motion of the one or more objects.

14. The media of claim 8, further comprising:
associating one or more portions of the one or more enclosures with one or more portions of the one or more objects, wherein each portion of the one or more enclosures tracks the one or more portions of the objects respectively.

15. A scanning device for sensing objects, comprising:
a memory that stores at least instructions; and
one or more processors configured that execute instructions that are configured to cause actions, including:
providing one or more enclosures that each include one or more of one or more event cameras, one or more beam generators, or one or more frame cameras, wherein one or more of the one or more event cameras or the one or more frame cameras are arranged to provide foveated resolution, and wherein the one or more beam generators scan a scene with one or more beams;
scanning a plurality of paths across one or more objects in the scene with the one or more beams;
determining a plurality of events based on detection of one or more beam reflections corresponding to one or more objects in the scene;
determining a plurality of trajectories based on the plurality of paths and the plurality of events, wherein each trajectory is a parametric representation of a one-dimensional curve segment in a three-dimensional space;
rotating the one or more enclosures to orient an optical axis of at least one of the frame cameras or event cameras into a physical position for continued scanning of the one or more objects within the FOV based on one or more directions of travel for the one or more objects, wherein a fovea of the one or more frame cameras is moved to position the one or more objects in a center of one or more sensors of the one or more frame cameras; and wherein the one or more frame cameras capture one or more images with the one or more objects centered in the one or more captured images; and
employing one or more of the plurality of trajectories to determine the one or more directions of travel for the one or more objects.

16. The scanning device of claim 15, wherein detecting the one or more beam reflections, further comprises:
detecting the one or more beam reflections by the one or more event cameras included in the one or more enclosures.

17. The scanning device of claim 15, wherein providing the one or more of the one or more event cameras or the one or more frame cameras, further comprises:
providing the one or more of the one or more event cameras or the one or more frame cameras that have a pixel density that is higher at a center of a sensor of the one or more of the one or more event cameras or the one or more frame cameras, wherein the pixel density is gradually decreasing towards the periphery of the sensor of the one or more of the one or more event cameras or the one or more frame cameras.

18. The scanning device of claim 15, wherein the one or more event cameras or the one or more frame cameras, further comprises:
integrating one or more foveation lenses into focusing optics of the one or more of the one or more event cameras or the one or more frame cameras, wherein the one or more foveation lenses spread out a light field coming into a center of one or more sensors of the one or more of the one or more event cameras or the one or more frame cameras to achieve a foveated effect.

19. The scanning device of claim 15, wherein the one or more event cameras or the one or more frame cameras, further comprises:
providing two or more event cameras or two or more frame cameras, wherein the two or more event cameras or two or more frame cameras have different resolutions or different fields-of-views.

20. The scanning device of claim 15, wherein the one or more processors of the scanning device are configured to execute instructions that are configured to cause actions, further comprising:
providing a light source that is separate from the one or more beam scanners that emits a beam of light centered around the aperture for one or more of the one or more enclosures;
detecting one or more edges of the one or more objects based on a portion of the one or more events that correspond to the one or more edges of the one or more objects interrupting the beam of light; and
employing one or more positions of the one or more edges to predict subsequent motion of the one or more objects.

21. The scanning device of claim 15, wherein the one or more processors of the scanning device are configured to execute instructions that are configured to cause actions, further comprising:
associating one or more portions of the one or more enclosures with one or more portions of the one or more objects, wherein each portion of the one or more enclosures tracks the one or more portions of the objects respectively.

22. A system for sensing objects:
a scanning device, comprising:
a memory that stores at least instructions; and
one or more processors that execute instructions that are configured to cause actions, including:
providing one or more enclosures that each include one or more of one or more event cameras, one or more beam generators, or one or more frame cameras, wherein one or more of the one or more event cameras or the one or more frame cameras are arranged to provide foveated resolution, and wherein the one or more beam generators scan a scene with one or more beams;
scanning a plurality of paths across one or more objects in the scene with the one or more beams;
determining a plurality of events based on detection of one or more beam reflections corresponding to one or more objects in the scene;
determining a plurality of trajectories based on the plurality of paths and the plurality of events, wherein each trajectory is a parametric representation of a one-dimensional curve segment in a three-dimensional space;
rotating the one or more enclosures to orient an optical axis of at least one of the frame cameras or event cameras into a physical position for continued scanning of the one or more objects within the FOV based on one or more directions of travel for the one or more objects, wherein a fovea of the one or more frame cameras is moved to position the one or more objects in a center of one or more sensors of the one or more frame cameras; and wherein the one or more frame cameras capture one or more images with the one or more objects centered in the one or more captured images; and employing one or more of the plurality of trajectories to determine the one or more directions of travel for the one or more objects; and one or more robot components, comprising:
one or more mount points for the one or more enclosures; and
one or more actuators that rotate the one or more enclosures.

23. The system of claim 22, wherein detecting the one or more beam reflections, further comprises:
detecting the one or more beam reflections by the one or more event cameras included in the one or more enclosures.

24. The system of claim 22, wherein providing the one or more of the one or more event cameras or the one or more frame cameras, further comprises:
providing the one or more of the one or more event cameras or the one or more frame cameras that have a pixel density that is higher at a center of a sensor of the one or more of the one or more event cameras or the one or more frame cameras, wherein the pixel density is gradually decreasing towards the periphery of the sensor of the one or more of the one or more event cameras or the one or more frame cameras.

25. The system of claim 22, wherein the one or more event cameras or the one or more frame cameras, further comprises:
integrating one or more foveation lenses into focusing optics of the one or more of the one or more event cameras or the one or more frame cameras, wherein the one or more foveation lenses spread out a light field coming into a center of one or more sensors of the one or more of the one or more event cameras or the one or more frame cameras to achieve a foveated effect.

26. The system of claim 22, wherein the one or more event cameras or the one or more frame cameras, further comprises:
providing two or more event cameras or two or more frame cameras, wherein the two or more event cameras or two or more frame cameras have different resolutions or different fields-of-views.

27. The system of claim 22, wherein the one or more processors of the scanning device are configured to execute instructions that are configured to cause actions, further comprising:
providing a light source that is separate from the one or more beam scanners that emits a beam of light centered around the aperture for one or more of the one or more enclosures;
detecting one or more edges of the one or more objects based on a portion of the one or more events that correspond to the one or more edges of the one or more objects interrupting the beam of light; and
employing one or more positions of the one or more edges to predict subsequent motion of the one or more objects.

28. The system of claim 22, wherein the one or more processors of the scanning device are configured to execute instructions that are configured to cause actions, further comprising:

associating one or more portions of the one or more enclosures with one or more portions of the one or more objects, wherein each portion of the one or more enclosures tracks the one or more portions of the objects respectively.

29. The method for sensing objects using one or more processors to execute instructions that are configured to cause actions, comprising:
providing one or more enclosures that each include one or more of one or more event cameras, one or more beam generators, or one or more frame cameras, wherein one or more of the one or more event cameras or the one or more frame cameras are arranged to provide foveated resolution, and wherein the one or more beam generators scan a scene with one or more beams;
providing a light source that is separate from the one or more beam scanners that emits a beam of light centered around the aperture for one or more of the one or more enclosures;
scanning a plurality of paths across one or more objects in the scene with one or more of the one or more beams or the light source;
determining a plurality of events based on detection of one or more beam reflections or one or more reflections of the light source, wherein the plurality of events correspond to one or more objects in the scene;
detecting one or more edges of the one or more objects based on a portion of the one or more events that correspond to the one or more edges of the one or more objects interrupting the beam of light;
predicting subsequent motion of the one or more objects based on one or more positions of the one or more edges;
rotating the one or more enclosures to orient an optical axis of at least one of the frame cameras or event cameras into a physical position for continued scanning of the one or more objects within the FOV based on one or more directions of travel for the one or more objects, wherein a fovea of the one or more frame cameras is moved to position the one or more objects in a center of one or more sensors of the one or more frame cameras; and wherein the one or more frame cameras capture one or more images with the one or more objects centered in the one or more captured images; and
employing one or more of the plurality of trajectories to determine the one or more directions of travel for the one or more objects.

30. The method of claim 29, further comprises:
determining a plurality of trajectories based on the plurality of paths and the plurality of events, wherein each trajectory is a parametric representation of a one-dimensional curve segment in a three-dimensional space; and
rotating the one or more enclosures to orient the optical axis of at least one of the frame cameras or event cameras into the physical position for continued scanning of the one or more objects within the FOV based on the one or more directions of travel for the one or more objects, wherein the one or more directions of travel for the one or more objects is calculated based on the one or more trajectories.

* * * * *